US010708630B1

(12) United States Patent
Pham

(10) Patent No.: US 10,708,630 B1
(45) Date of Patent: Jul. 7, 2020

(54) NETWORKING METHODS AND NETWORK SYSTEMS FOR TRANSPORTATION VEHICLES

(71) Applicant: Panasonic Avionics Corporation, Lake Forest, CA (US)

(72) Inventor: Thong Pham, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 16/292,046

(22) Filed: Mar. 4, 2019

(51) Int. Cl.
*H04N 21/214* (2011.01)
*H04N 21/414* (2011.01)
*H04N 21/647* (2011.01)
*H04N 21/4425* (2011.01)

(52) U.S. Cl.
CPC ... *H04N 21/2146* (2013.01); *H04N 21/41422* (2013.01); *H04N 21/4425* (2013.01); *H04N 21/64784* (2013.01)

(58) Field of Classification Search
None
See application file for complete search history.

(56) References Cited

U.S. PATENT DOCUMENTS

| 5,617,331 | A | * | 4/1997 | Wakai | H04H 20/62 348/E7.049 |
|---|---|---|---|---|---|
| 5,745,159 | A | * | 4/1998 | Wax | H04H 20/12 455/14 |
| 6,249,913 | B1 | * | 6/2001 | Galipeau | H04N 7/17318 348/E5.002 |
| 8,621,527 | B2 | * | 12/2013 | Couleaud | H04H 20/62 725/149 |
| 10,112,558 | B2 | | 10/2018 | Panguluri et al. | |
| 2006/0250947 | A1 | * | 11/2006 | Allen | H04L 12/40182 370/216 |
| 2006/0293190 | A1 | * | 12/2006 | Watson | E04G 21/10 505/126 |
| 2007/0025240 | A1 | * | 2/2007 | Snide | H04L 12/40169 370/217 |
| 2009/0007194 | A1 | * | 1/2009 | Brady, Jr. | H04N 7/10 725/77 |
| 2009/0077595 | A1 | * | 3/2009 | Sizelove | G06F 1/1626 725/76 |

(Continued)

OTHER PUBLICATIONS

Abaye, Ali, "Broadr-Reach Technology: Enabling One Pair Ethernet", Broadcom Corporation, 2012.

*Primary Examiner* — Alexander Q Huerta
(74) *Attorney, Agent, or Firm* — Klein, O'Neill & Singh, LLP

(57) ABSTRACT

Methods and networks for a transportation vehicle are provided. One method includes detecting a fault by a network device of a distribution network of an aircraft, the distribution network used for distributing data to a plurality of seat devices of the aircraft, where the network device detects the fault when it is unable to receive data at a first port via a first path of a network connection; disabling the first port by the network device; inverting a data line of a first switch of the network device; initializing a second port of the network device for receiving data from a second path using the inverted data line of the first switch, the second port used as a loopback port; and transmitting the received data to the plurality of seat devices via a third port using an inverted data line of a second switch of the network device.

20 Claims, 24 Drawing Sheets

(56) References Cited

U.S. PATENT DOCUMENTS

| | | | |
|---|---|---|---|
| 2010/0115326 A1* | 5/2010 | Westeroth | H04L 67/00 |
| | | | 714/4.1 |
| 2011/0029998 A1* | 2/2011 | Yip | H04N 7/16 |
| | | | 725/14 |
| 2011/0107377 A1* | 5/2011 | Petrisor | H04L 12/40182 |
| | | | 725/76 |
| 2011/0162015 A1* | 6/2011 | Holyoake | H04N 7/18 |
| | | | 725/76 |
| 2013/0083696 A1* | 4/2013 | Petrisor | H04N 7/22 |
| | | | 370/254 |

* cited by examiner

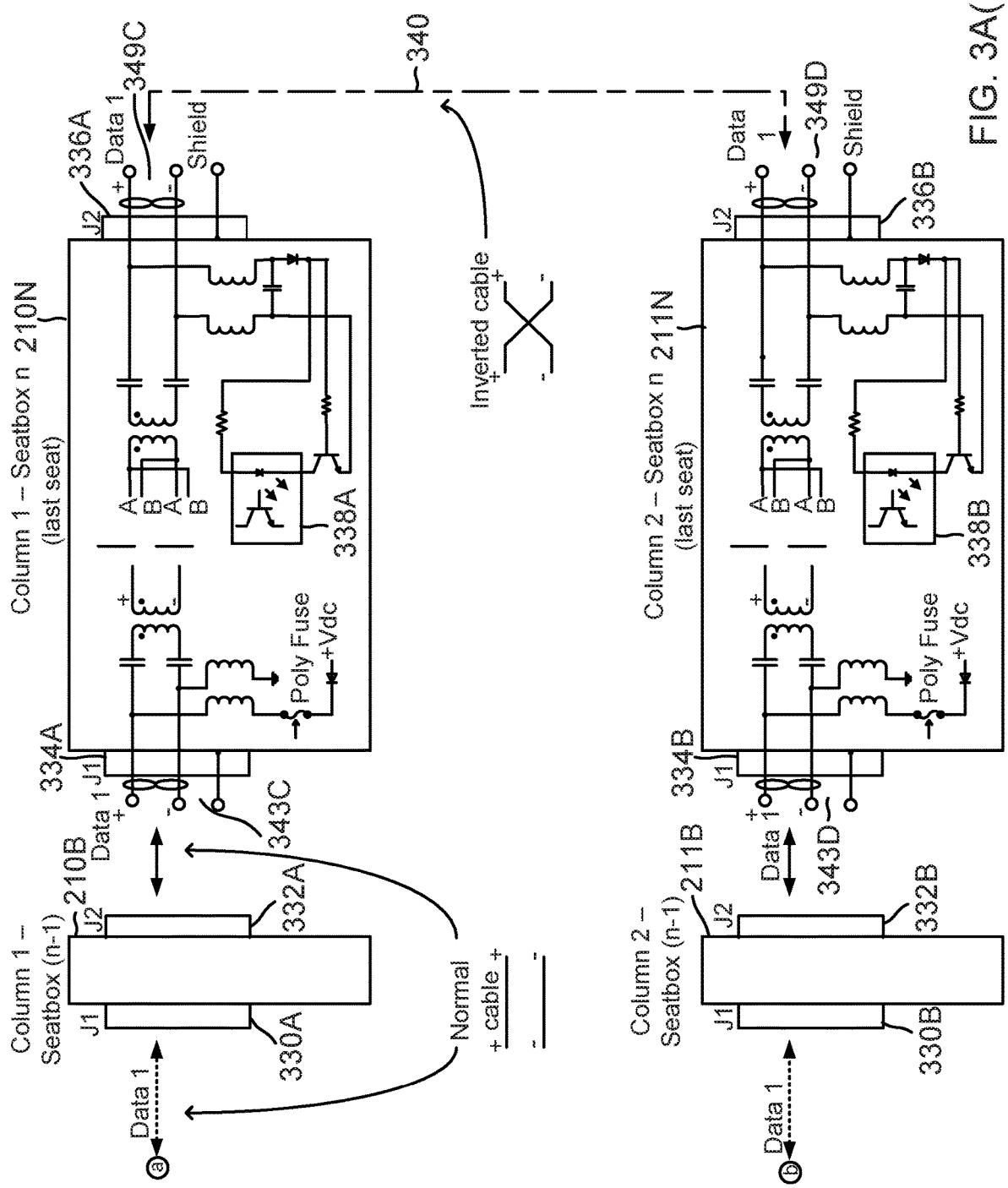
FIG. 3A(ii)

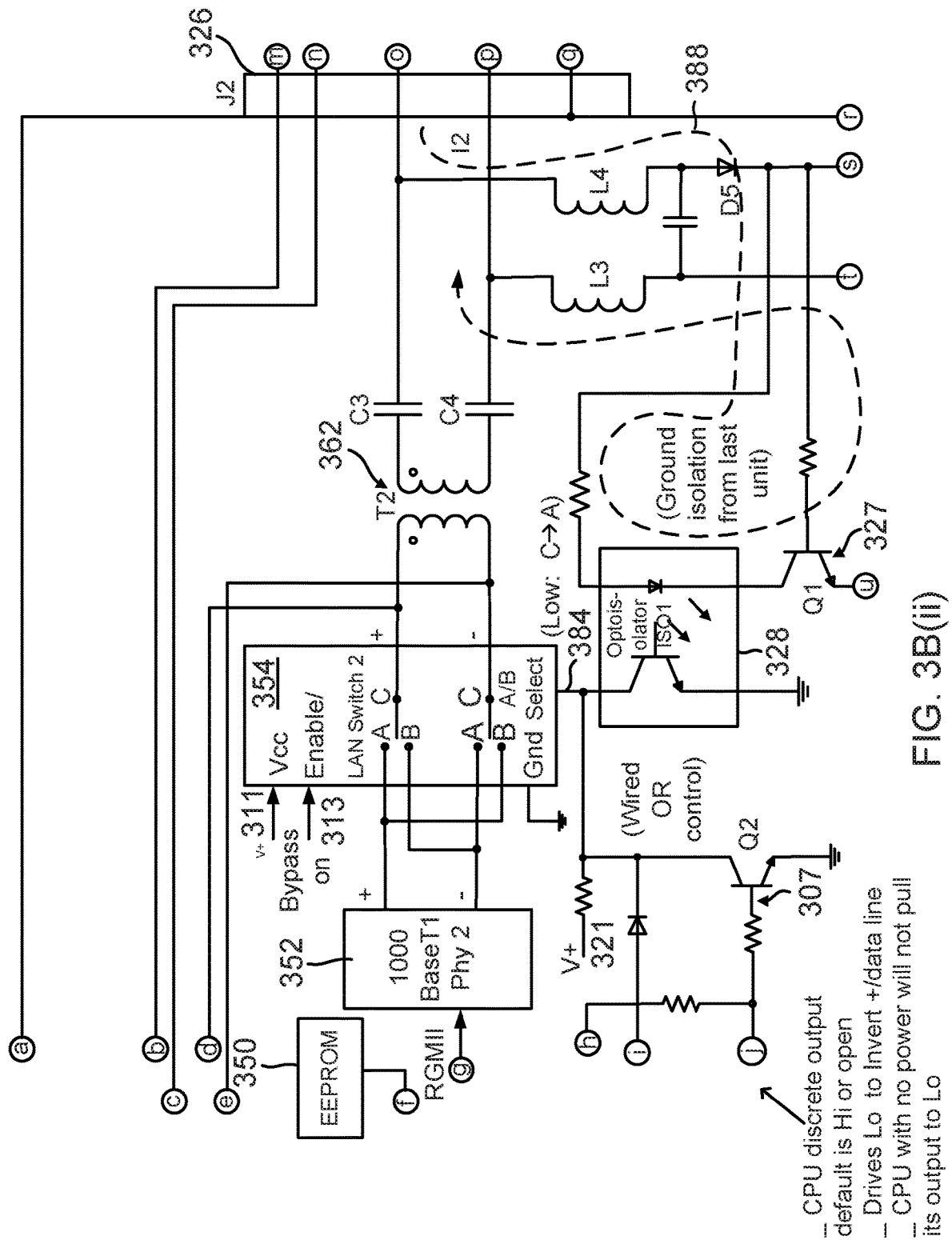
FIG. 3B(ii)

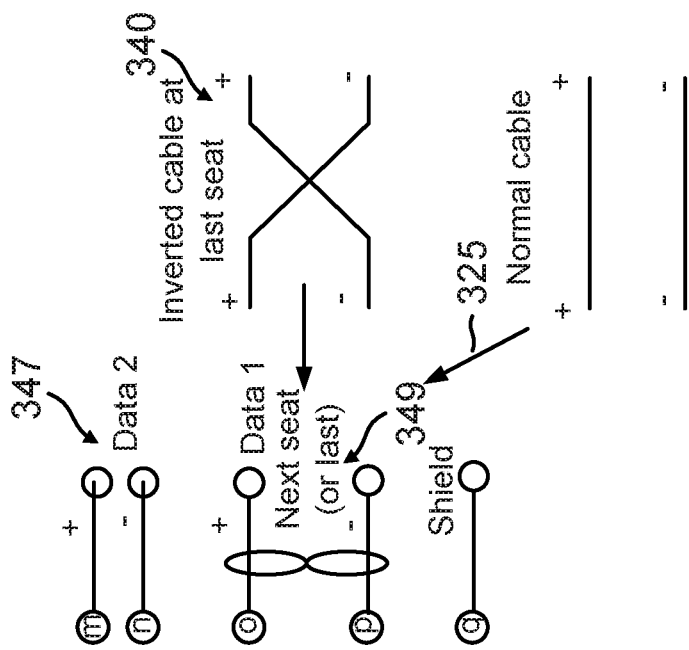
FIG. 3B(iii)

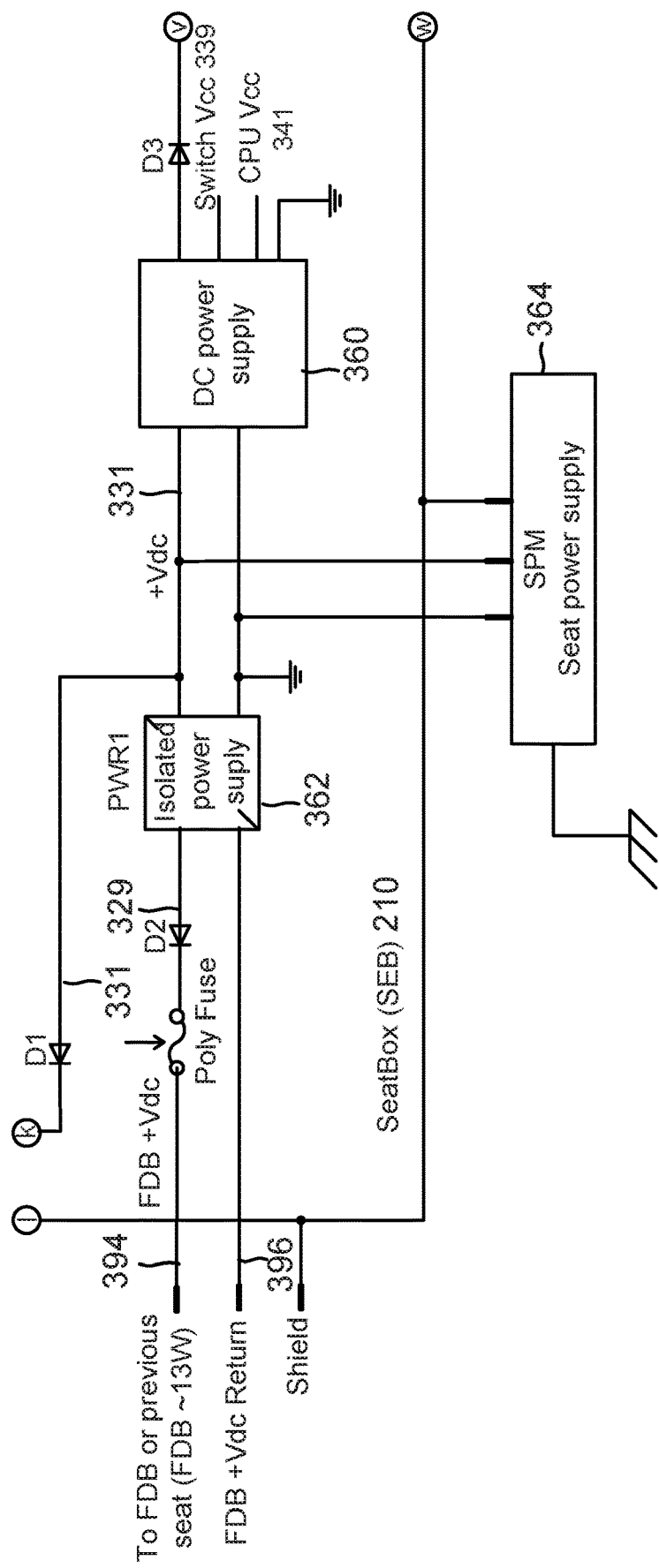
FIG. 3B(iv)

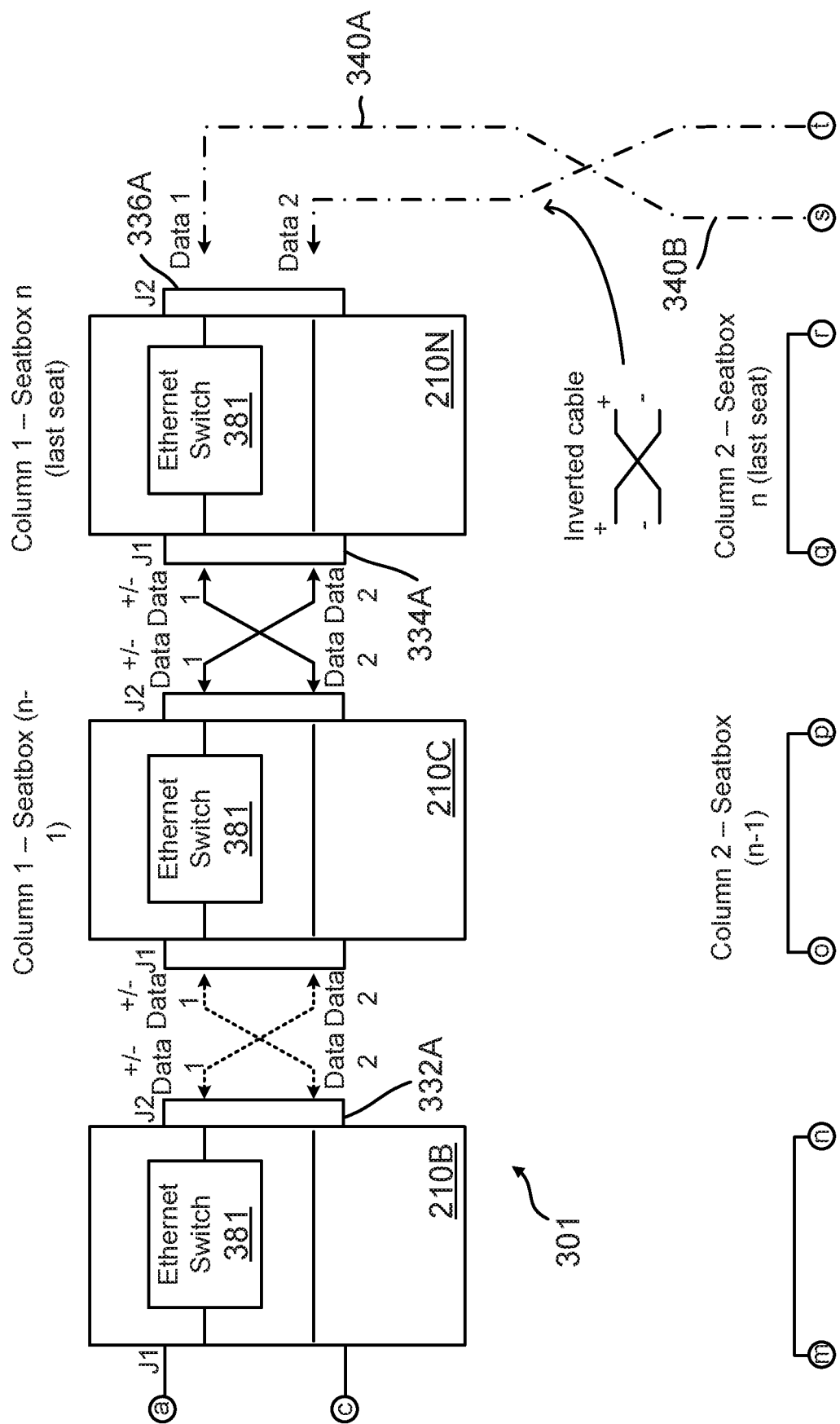
FIG. 5A(ii)

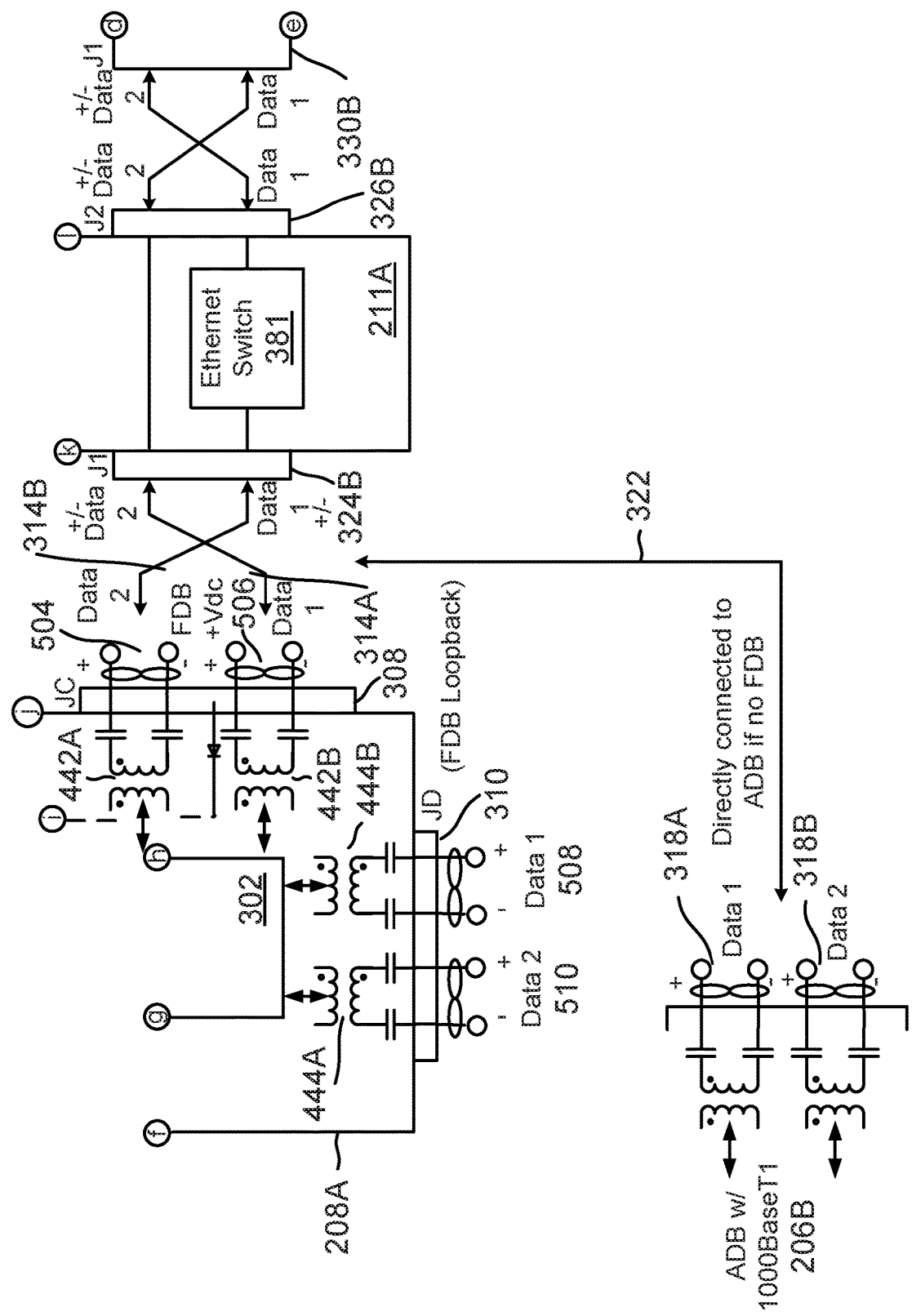
FIG. 5A(iii)

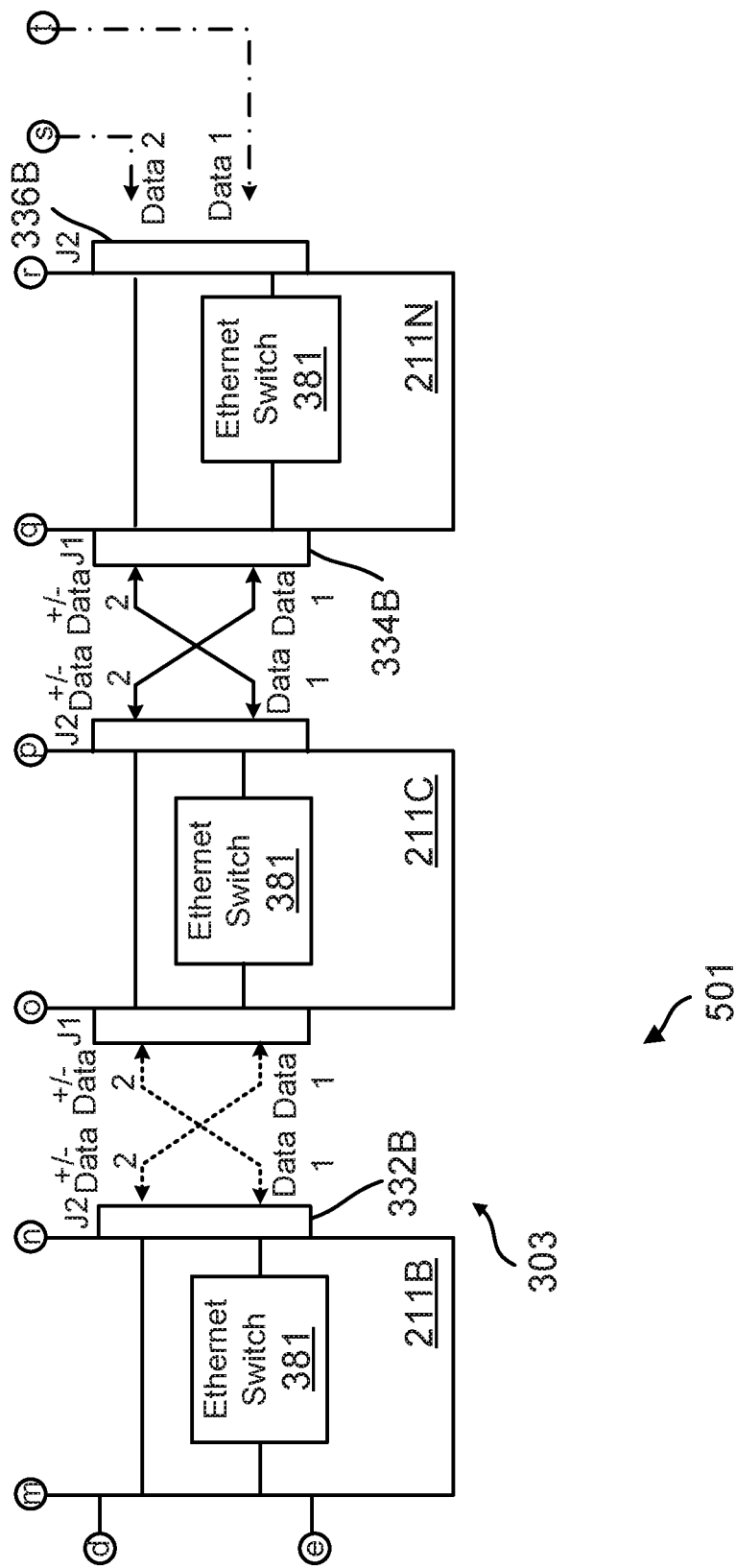
FIG. 5A(iv)

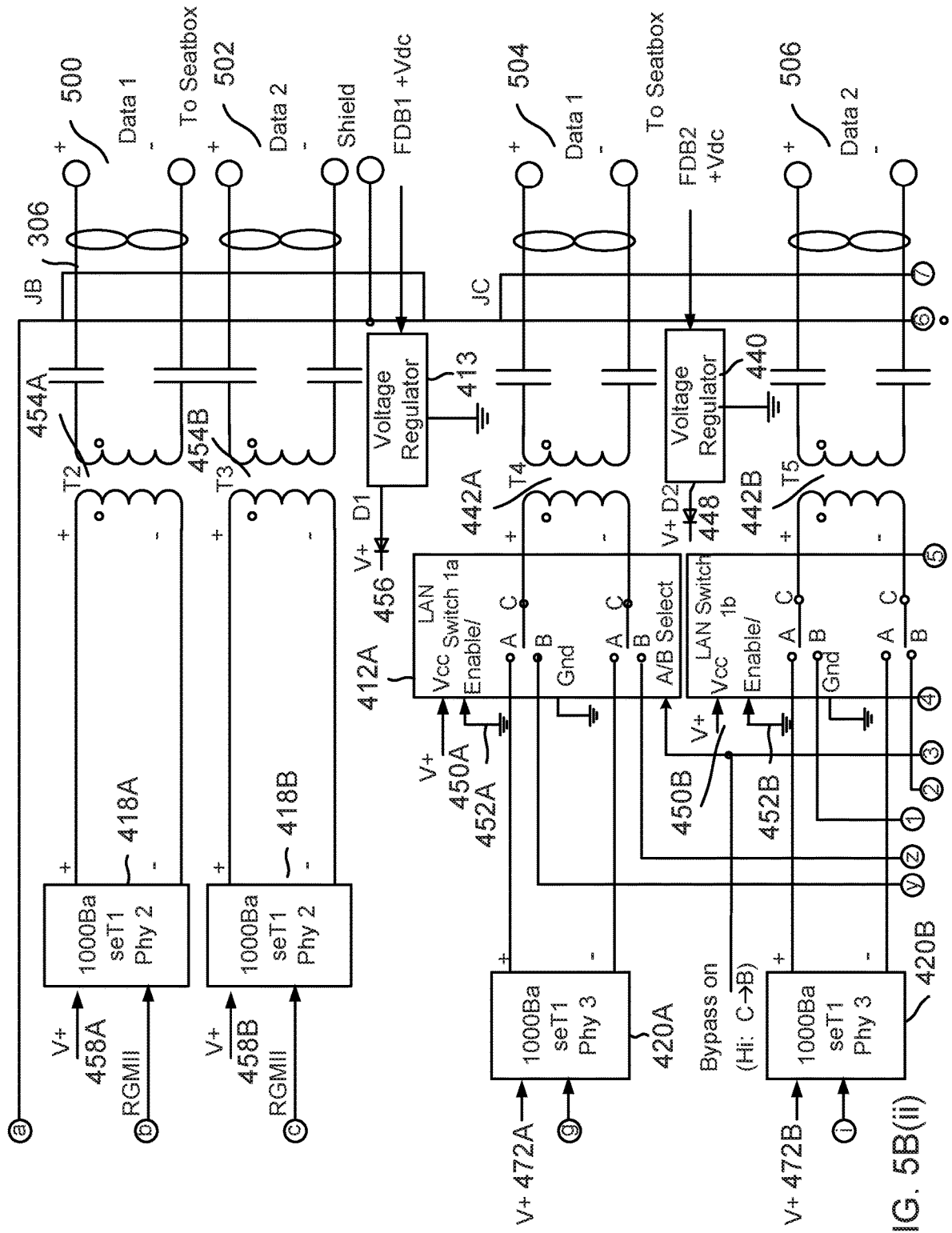
FIG. 5B(ii)

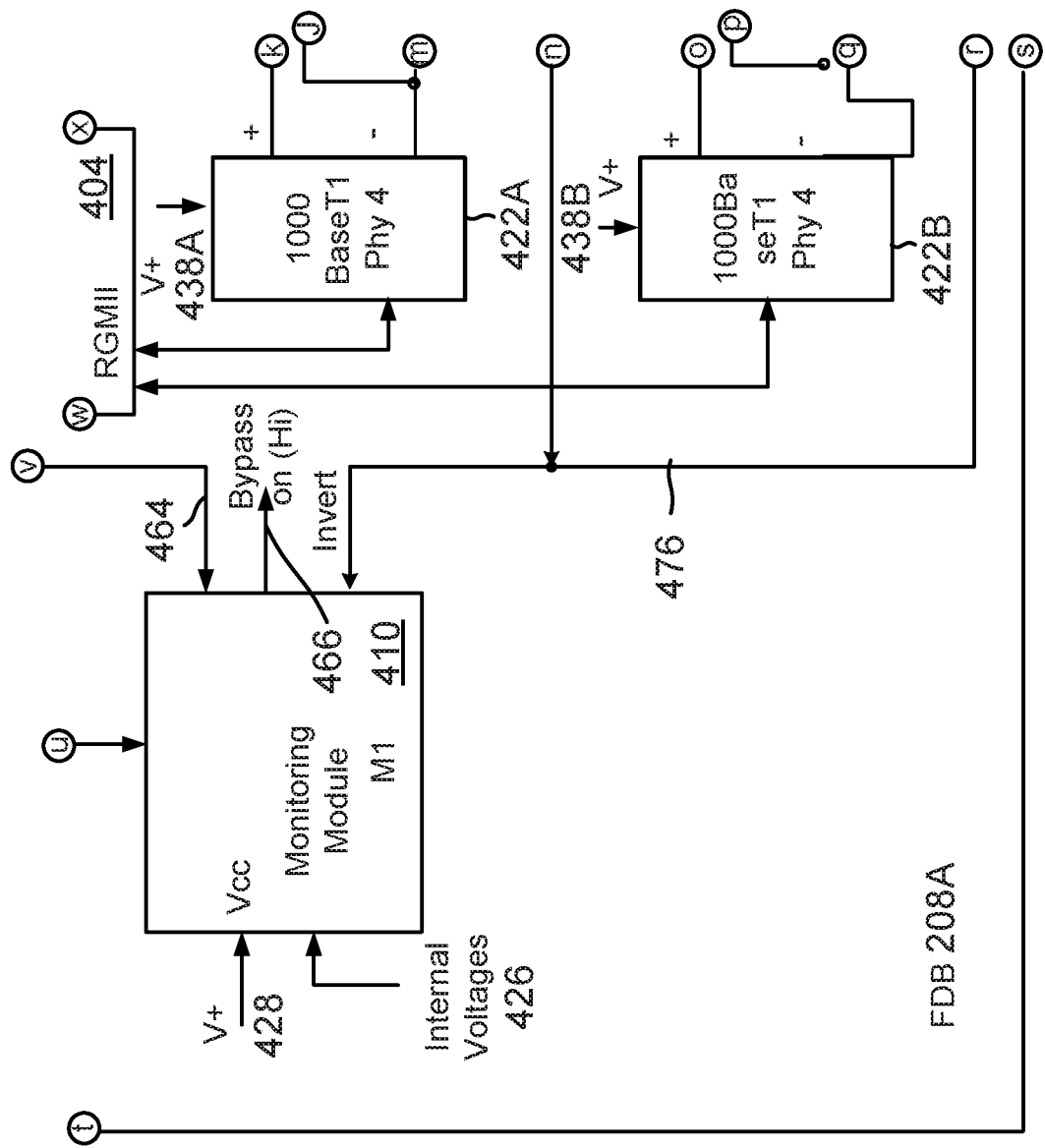
FIG. 5B(iii)

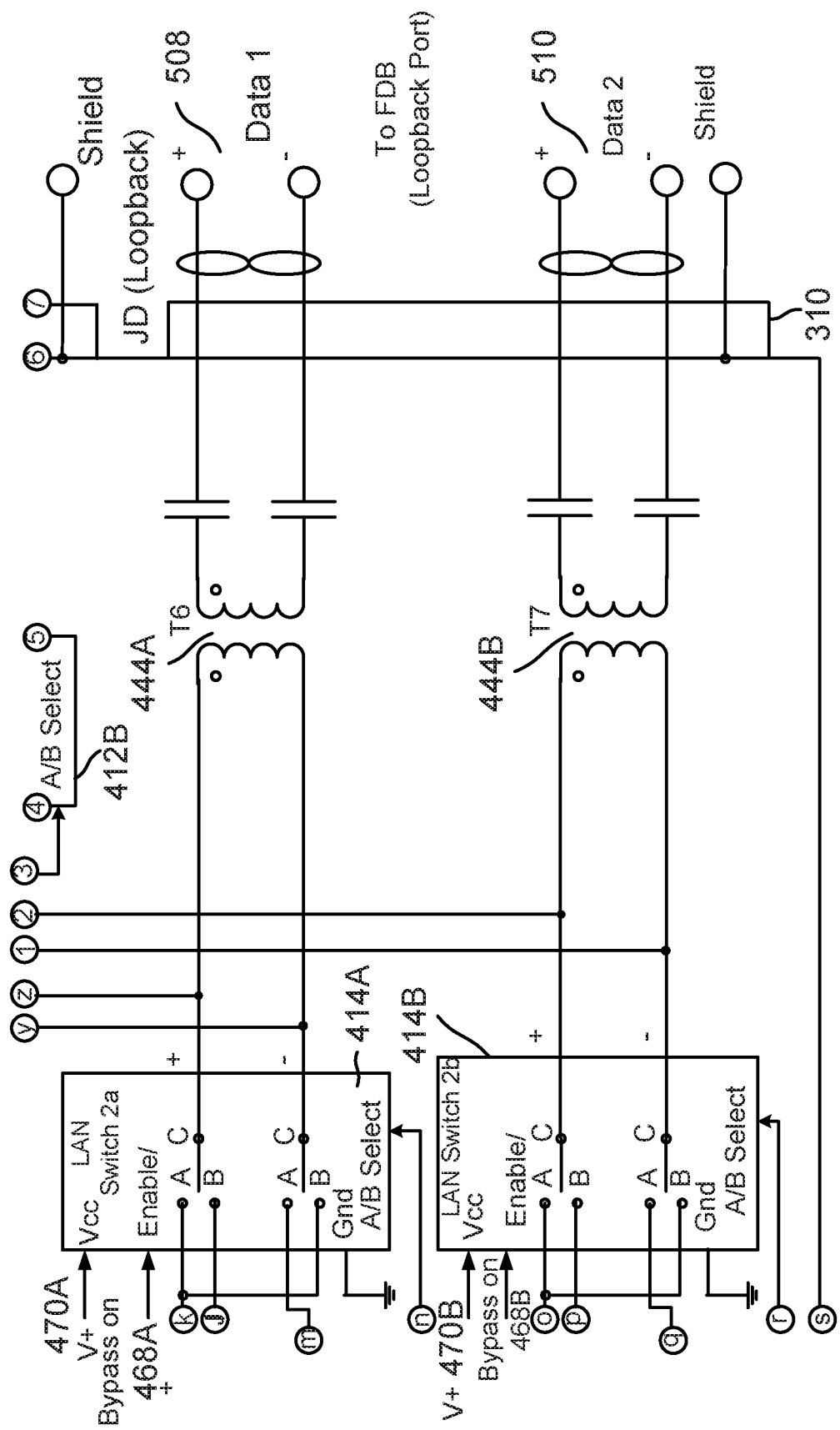
FIG. 5B(iv)

NETWORKING METHODS AND NETWORK SYSTEMS FOR TRANSPORTATION VEHICLES

TECHNICAL FIELD

The present disclosure relates to data distribution networks of transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today may have individualized functional equipment dedicated to a particular passenger seat, which can be utilized by the passenger, such as video and/or audio entertainment systems, adjustable seats, adjustable environmental controls, adjustable lighting, telephony systems, crew communication systems, and the like. Many commercial airplanes today may also have individualized video and audio entertainment systems, often referred to as "inflight entertainment" or "IFE" systems. Such systems may also be referred to as "inflight entertainment and communication" systems as well, and typically abbreviated as "IFEC" systems.

As one example of a function that a passenger may activate, entertainment systems for passenger carrier vehicles, such as commercial airlines, often have video displays installed at each passenger seat. For instance, video displays may be provided at each passenger seat, such as mounted at each of the seats of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), Internet browsing, and other computer applications. Sometimes such displays are referred to as smart monitors due to the ability to provide computer applications and process and store data internally.

Conventional IFE networks deploy a seat distribution network for distributing content/data to passenger seat devices. Conventional seat distribution networks typically use Gigabit Ethernet 1000BaseT interface for connecting network devices for data distribution. The 1000BaseT technology uses four pairs (i.e. 8 wires) of high speed twisted pair cables for data line connection. In conventional systems, when there is internal fault at a seat box of the seat distribution network, network fault bypass function is enabled by using relays or analog switches in the seat box that connects between transmit (Tx) and receive (Rx) signal pairs to bypass internal switches of the seat box. For other faults, e.g. broken cables etc., a column loopback function is implemented by using multiple cables that connect a TX-TX and Rx-Rx pair of the last two seat boxes of a column of seats.

New Gigabit Ethernet 1000BaseT1 technology has been developed that uses one pair (i.e. 2 wires) for wired data connections. This technology reduces overall weight for the seat distribution network and hence is desirable for weight conscious systems, e.g. aircraft seat distribution networks. However, the 1000BaseT1 technology has design challenges for providing redundancy and recovery because the data line connection is bi-directional and connections between separate Tx and Rx paths are unavailable. Therefore, networking technology is being developed to efficiently use 1000BaseT1 technology for providing redundancy and recovery paths in seat distribution networks.

SUMMARY

In one aspect, a method is provided. The method includes detecting an internal fault at a seat electronic box (SEB) of a distribution network of an aircraft, the distribution network used for distributing data to a plurality of seat devices. The SEB includes a first switch that receives data from a first port, and a second switch connected to a second port that transmits data to a next SEB, when the SEB is not a last SEB of a first column having a plurality of SEBs. The method further includes initiating a bypass mode at the SEB, in response to detecting the internal fault; disabling the second switch in response to initiating the bypass mode; enabling connection between a first terminal and a second terminal of the first switch for the bypass mode; and transferring data from the first port to the second port via the first switch using the first terminal, and the second terminal, bypassing the second switch disabled for the bypass mode.

In another aspect, a method includes detecting a fault by a network device of a distribution network of an aircraft, the distribution network used for distributing data to a plurality of seat devices of the aircraft, where the network device detects the fault when it is unable to receive data at a first port via a first path of a network connection; disabling the first port by the network device; inverting a data line of a first switch of the network device; initializing a second port of the network device for receiving data from a second path using the inverted data line of the first switch, the second port used as a loopback port; and transmitting the received data to the plurality of seat devices via a third port using an inverted data line of a second switch of the network device.

In yet another aspect, a network for an aircraft is provided. The network includes a plurality of SEBs coupled to a plurality of seat devices, the SEBs used for distributing content to the plurality of seat devices for an in-flight entertainment system. A SEB includes a first switch that receives data from a first port and a second switch connected to a second port to transmit data to a next SEB, when the SEB is not a last SEB of a first column of SEBs. When the SEB detects an internal fault and initiates a bypass mode, the second switch is disabled, enabling connection between a first terminal and a second terminal of the first switch. During the bypass mode, data from the first port is transferred to the second port via the first switch using the first terminal and the second terminal, bypassing the disabled second switch.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter. Conditional processing/routing may be expressed by either if or when qualifiers, which are used interchangeably herein and intended to have the same meaning.

Figure 1A:
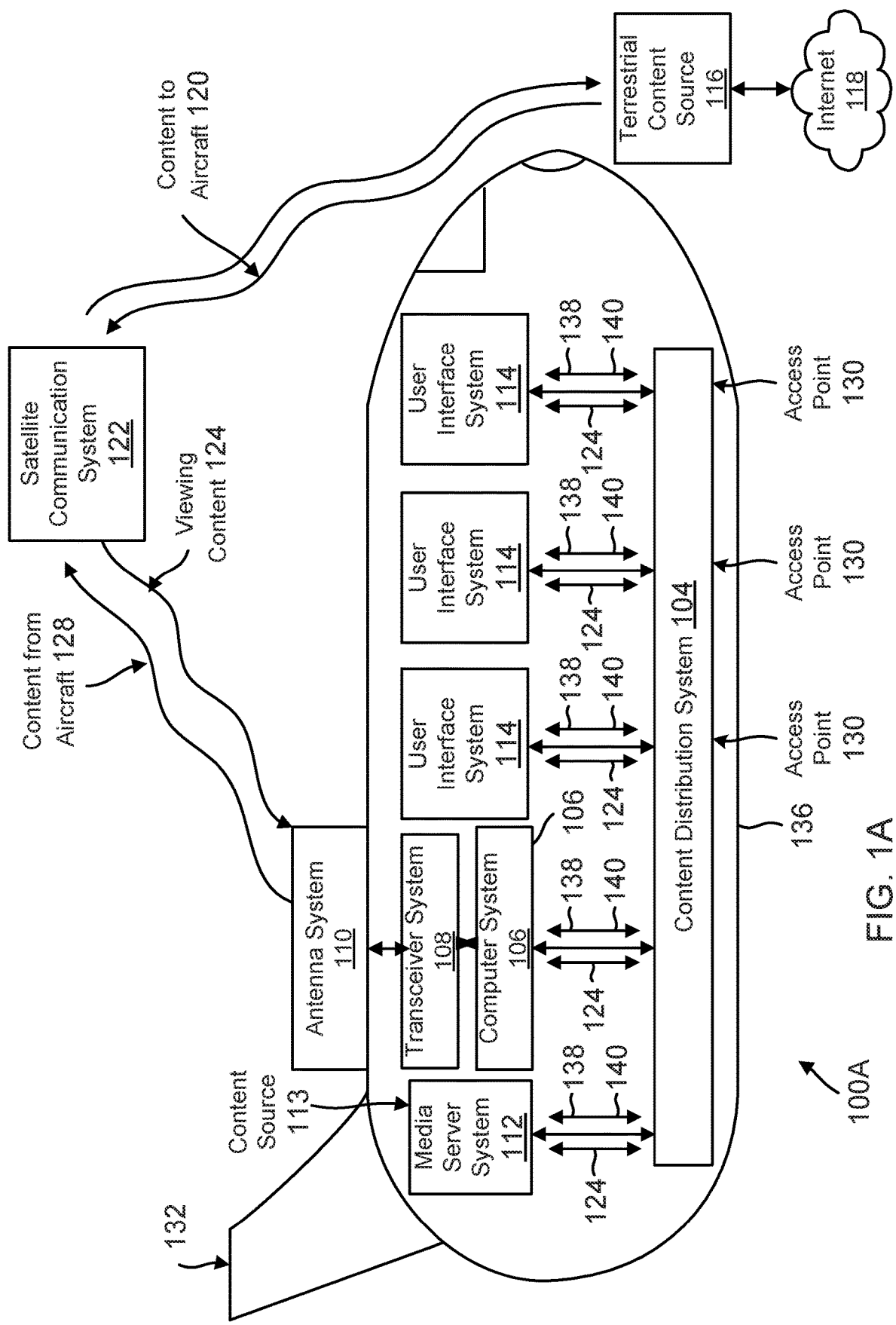
FIG. 1A shows an example of an operating environment for implementing the various aspects of the present disclosure on an aircraft.

Vehicle Information System:

FIG. 1A shows an example of a generic vehicle information system 100A (also referred to as system 100A) that can be configured for installation aboard an aircraft 132 for using the innovative technology described herein, according to one aspect of the present disclosure.

When installed on an aircraft, system 100A can comprise an aircraft passenger in-flight entertainment (IFE) system, such as the Series 2000, 3000, eFX, eX2, eX3, eXW, NEXT, and/or any other inflight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system.

The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content 124 as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the content 120, as processed by the transceiver system 108, to a computer system 106 of system 100A. The computer system 106 can provide the received content 120 to the media (or content) server system 112 and/or directly to one or more of the user interfaces 114 as viewing content 124. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. In one aspect, the user interface system 114 includes a hardware interface to connect to an access point 130 that provides a wired and/or a wireless connection for the user interface system.

In one aspect, the user interface system 114 comprises a processor executable application that a user downloads and installs to receive and view content via an access point 130. The user interface system 114 may also include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

Figure 1B:
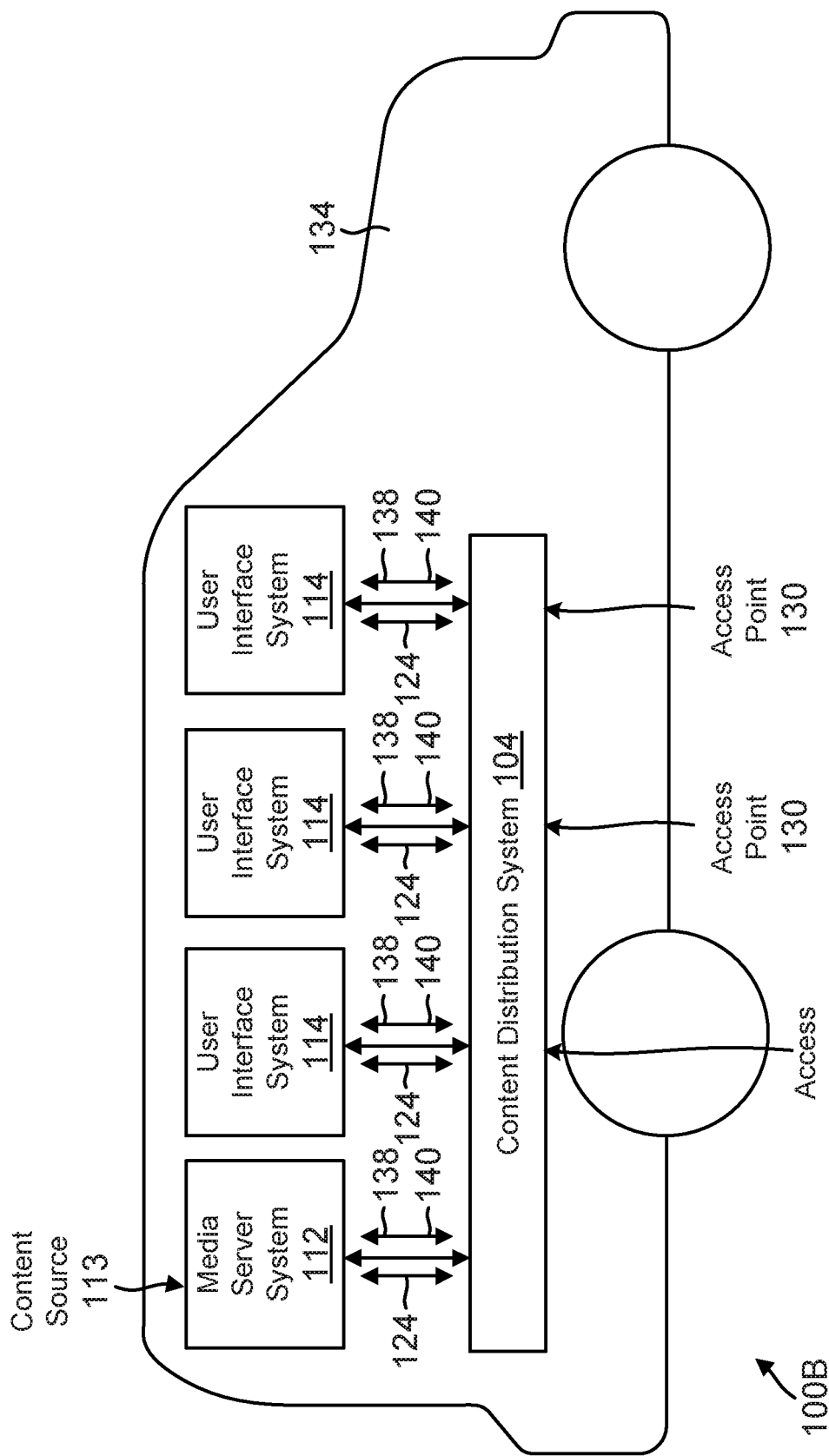
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
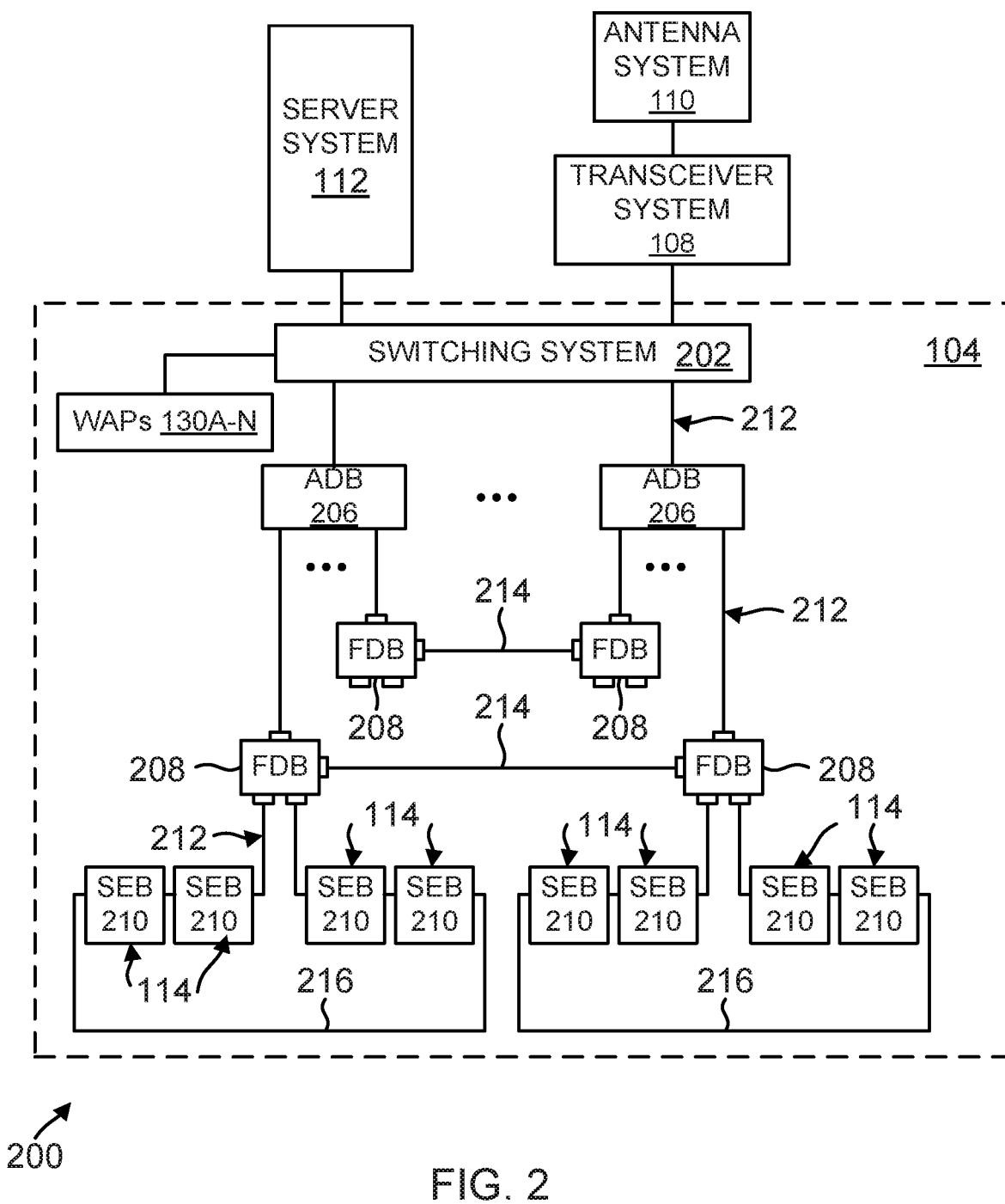
FIG. 2 shows an example of a content distribution system on an aircraft, used according to one aspect of the present disclosure.

Content Distribution System:

FIG. 2 illustrates an example of the content distribution system (may also be referred to as a distribution system, a seat distribution network or a distribution network) 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T/100 Base-T1) communication network and/or Gigabit (such as 1000 Base-X and/or 1000 Base-T/1000Base-T1) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the content distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBS 206 and the associated FDBs 208 can be coupled in any conventional configuration, the associated FDBs 208 preferably are disposed in a star network topology about a central area distribution box 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the area distribution boxes 206, the FDBs 208, the SEBs (and/or VSEBs), and/or PSEBs) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of SEBs 210 for a selected FDB 208 as shown in FIG. 2. Each SEB loopback connection 216 therefore forms a loopback path among the daisy-chained SEBs 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
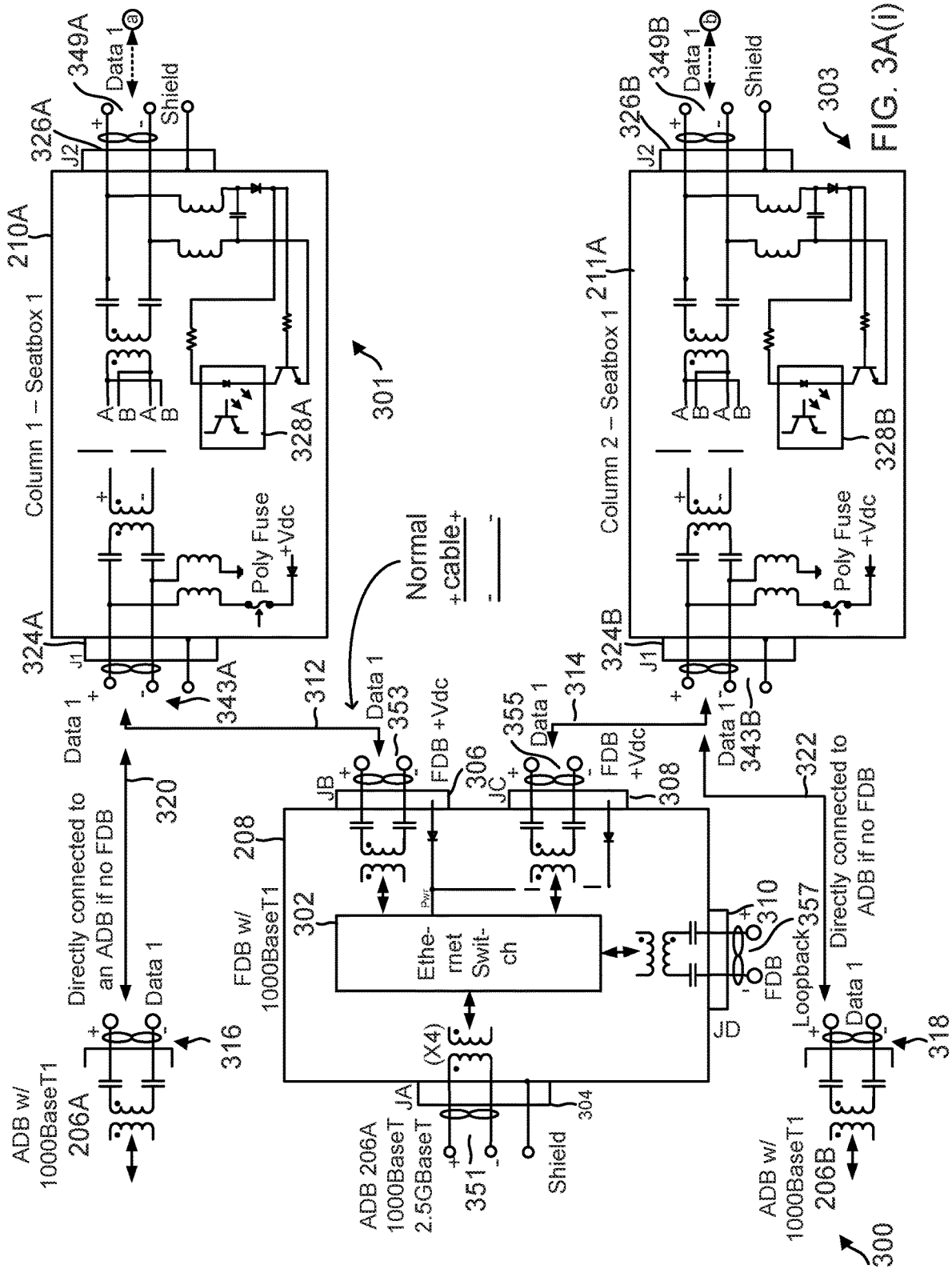
FIG. 3A (shown in FIG. 3A(i)-(ii)) shows another example of a content distribution system, according to one aspect of the present disclosure.

System 300:

FIG. 3A shows an example a content distribution system 300 (similar to the system 104 of FIG. 2), according to one aspect of the present disclosure. System 300 includes a first column 301 and a second column 303, each column comprising of a plurality of SEBs 210A-210N (similar to SEBs 210, FIG. 2) and 211A-211N (similar to SEBs 210), where the SEBs 210N and 211N are the last SEB of each column, while SEBs 210A and 211A are located at the front of each column. The adaptive aspects of the present disclosure are not limited to any specific number of SEBs or number of columns.

Each SEB has a plurality of interfaces with one or more ports for receiving and transmitting data. For example, SEB 210A has an interface 324A with port 343A coupled to an ADB port 316 of an ADB 206A via a standard (or "normal") cable 320. When FDBs are used on an aircraft, then port 343A is coupled to port 353 of an interface 306 of a FDB 208 via a standard cable 312 that is similar to cable 320. In standard cables 320/312, a positive terminal is connected to another positive terminal and a negative terminal is connected to another negative terminal. The term port used throughout this specification is a component of a network device (e.g. SEB, FDB, ADBs and switching systems) that includes logic and circuitry for receiving and transmitting information.

Interface 326A of SEB 210A includes a port 349A that is coupled to an interface 330A of SEB 210B, while an interface 332A of SEB 210B is coupled to a port 343C of an interface 334A of SEB 210N using standard cables similar to cable 320/312.

Similar to SEB 210A, the first SEB 211A of column 303 includes an interface 324B and 326B with ports 343B and 349B, respectively. Port 343B is coupled to port 355 of interface 308 of FDB 208 via a cable 314 (similar to cable 312), when a FDB is deployed on an aircraft. When a FDB is not deployed on an aircraft, port 343B is coupled to port 318 of an ADB 206B via a cable 322 (similar to cable 312). Port 349B of interface 326B is coupled to interface 330B of SEB 211B and interface 332B is coupled to port 343D of interface 334B of SEB 211N. Port 349C of the last SEB 210N of column 301 and port 349D of the last SEB 211N of column 303 are connected by an inverted cable 340. The inverted cable connects a positive terminal to a negative terminal, unlike the standard cable where a positive terminal is connected positive terminal and a negative terminal is connected to another negative terminal. The inverted cable 340 is used to provide redundancy in system 300 by reversing data flow, as described below in detail. Each SEB also includes inverting logic 328A, 328B, 338A and 338B, respectively. Details regarding using the inverted logic are provided below.

In one aspect, ADB ports 316 and 318 receive data from another device (e.g. media server 112 or any other content source) for distribution to SEBs in columns 301 and 303. When FDB 208 is deployed, then port 351 of interface 304 of FDB 208 is coupled to an ADB (not shown) and receives incoming data for distribution.

In one aspect, FDB 208 includes a loop back port 357 at interface 310 that is coupled to a loopback port of another FDB (not shown in FIG. 3A) using an inverted cable similar to inverted cable 340. The loopback port is used to obtain data from another FDB when data is not received at port 351. FDB 208 also includes a switch (e.g. an Ethernet switch) 302 that routes incoming and outgoing packets using one of ports 351, 353, 355 and 357.

Figure 3B:
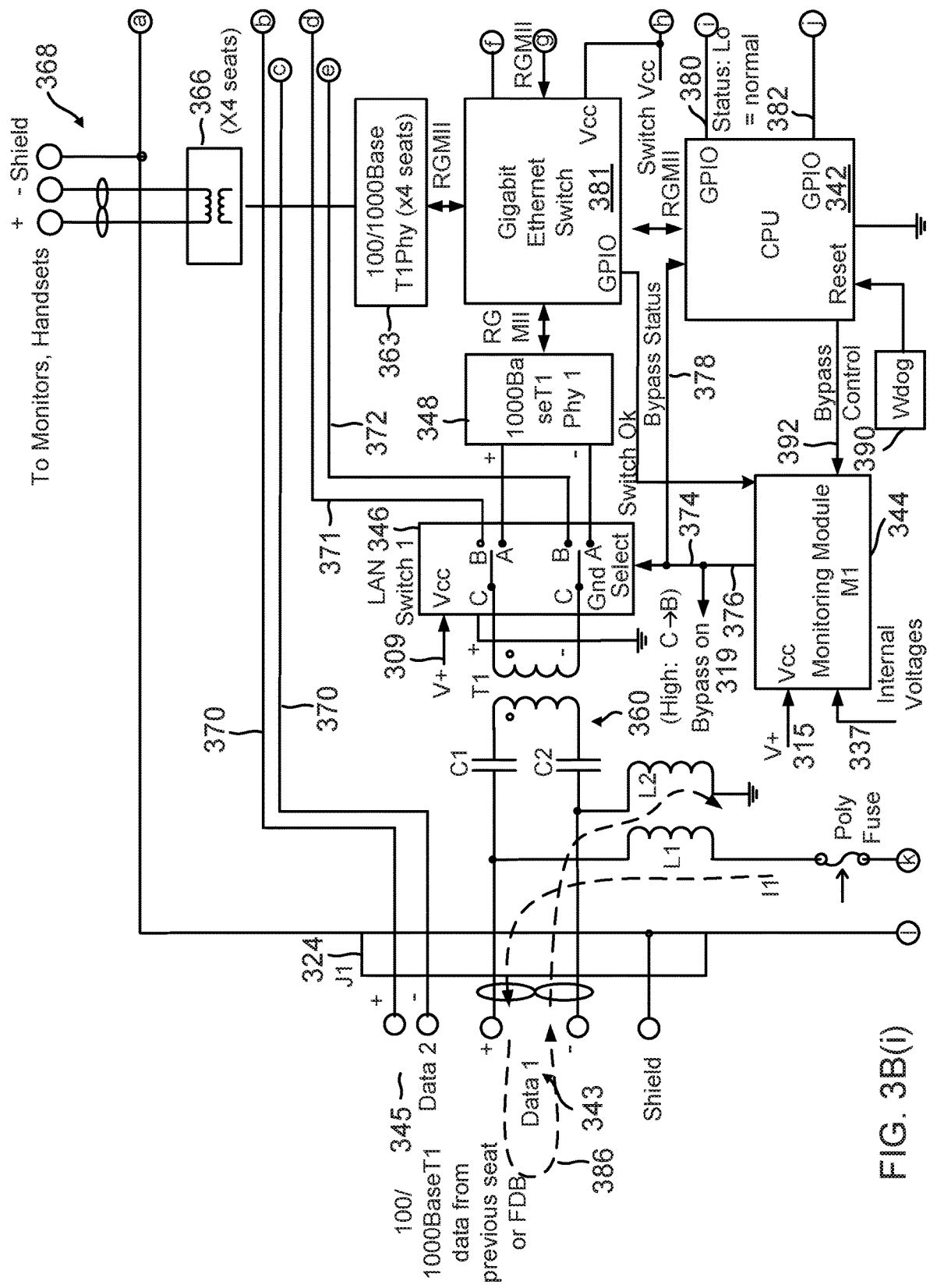
FIG. 3B (shown in FIG. 3B(i)-3B(v)) shows a schematic of a seat electronic box (SEB) used in a content distribution system, according to one aspect of the present disclosure.
Figure 3B:
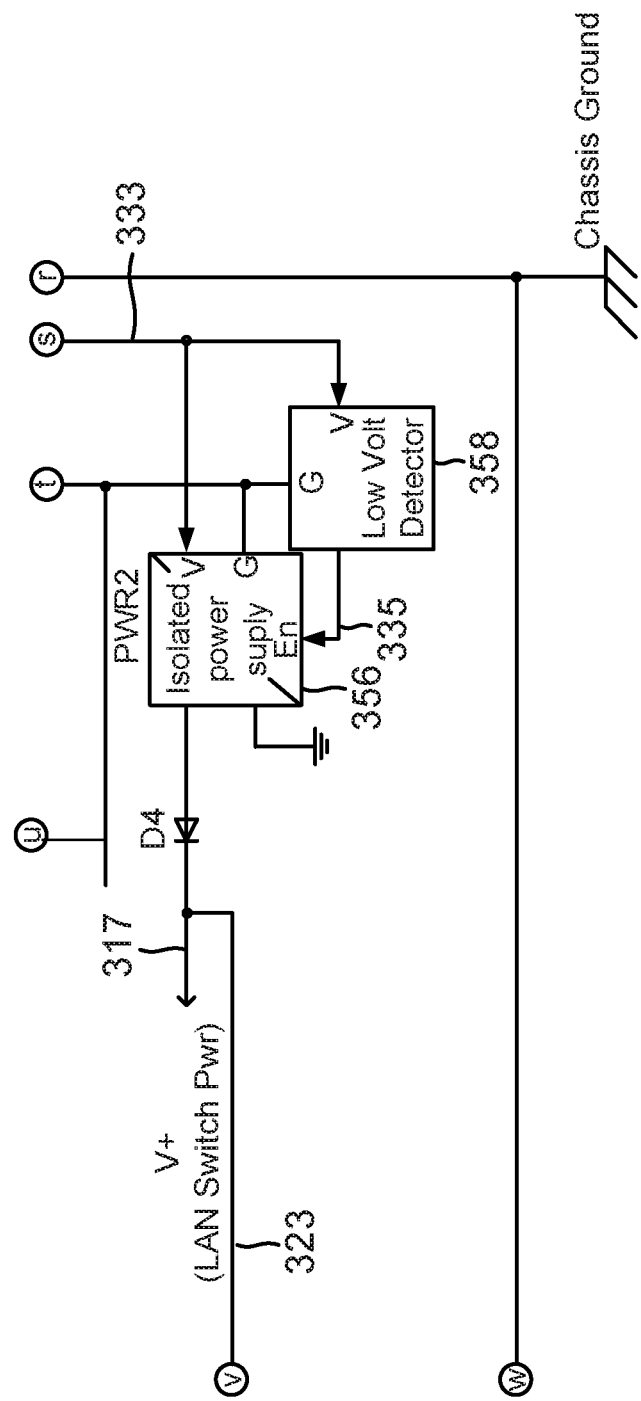

SEB 210:

FIG. 3B shows a schematic for SEB 210, according to one aspect of the present disclosure. SEB 210 of FIG. 3B is similar to SEBs 210A, 210B, 210N, 211A, 211B and 211N briefly described above with respect to FIG. 3A. SEB 210 is connected to a plurality of seat devices (or seats) via module 366 and port 368 to provide received data to handsets/monitors (not shown). It is noteworthy that when SEB 210 is the last SEB of column 301 or 303, then the SEB is connected to a port of another last SEB of a different column using inverted cable 340, as shown in FIG. 3A and described above.

SEB 210 includes a port 343 at interface 324, shown as an upstream port connected to a FDB 208 or to another SEB for receiving data. In one aspect, a normal cable 312 with a 100/1000BaseT1 interface is used at port 343 to receive data from a FDB, an ADB or another SEB. Port 343 supports the data path labelled as "Data 1" while a second port 345 of interface 324 supports a second data path labelled as "Data 2". The second data path is used to double the throughput of SEB 210 using paths 370 for connecting ports 345 and 347, respectively, as described below with respect to FIGS. 5A-5B.

Port 349 of interface 326, shown as a downstream port sends data to another SEB via a standard cable 325 (similar to 312, FIG. 3A). In another aspect, when port 349 is the port for the last SEB (for example, port 349C of SEB 210N shown in FIG. 3A) then the inverted cable 340 is used to connect port 349 to a port (e.g. 349D) of a last SEB (211N)

of another column to provide redundancy in the system, as described below in more detail.

SEB 210 further includes various other components, for example, transformers 360 and 362 operating as input and output transformers, depending on a direction of a data path for sending and receiving data, a central processing unit (CPU) 342, a watchdog module (shown as "Wdog") 390, a local area network (LAN) switch 1 346 (may be referred to as switch 346 or internal switch 346) and LAN switch 2 354 (may be referred to as switch 354 or internal switch 354), a switch (shown as Gigabit Ethernet switch) 381 with access to a memory device (shown as "EEPROM") 350, and various PHY modules 348, 352 and 363. SEB 210 further includes a low voltage detector 358, isolated power supply modules (shown as isolated power supply) 356 and 362, isolator 384 and a DC power supply module (shown as DC power supply) 360. SEB 210 also includes a monitoring module (shown as Ml) 344 that monitors various components of SEB 210 to enable or disable bypass functionality, described below in detail. The monitoring module 344 is powered by voltage 315

SEB 210 may receive power from an external supply unit ("SPM" shown as seat power supply)) 364 that is regulated by the DC power supply 360. Output 341 from module 360 provides voltage (Vcc) to CPU 342, output 339 provides voltage (Vcc) to switch 381.

An output (i.e. a DC current) 331 passes through diode D1, inductor L1 and then returns from port 343 (shown as loop I1 386). The DC bias 331 is used to power LAN switches 346 and 354 via inputs shown as 309 and 311, respectively, and other bypass circuitry described below in detail. The power supply from module 360 may be isolated by isolator 362. A DC current 329 from the isolator 362 is provided to a FDB or a previous seat (shown by 394) via diode D2. The return path from the FDB to the isolator 362 is shown as 396.

DC bias power may also be received at interface 326 via inductors L4 and L3 (shown by loop 388) from another SEB that is located behind SEB 210 (for example, SEB 210B behind SEB 210A of FIG. 3A). The presence of the DC bias at interface 326 indicates to the SEB that it is not the last SEB unit within a column having a plurality of SEBs. The DC bias signal also ensures that the CPU 342 cannot inadvertently invert a data line at port 349. It is noteworthy that only the CPU 342 of the last SEB of a column can invert the data line at port 349, when it receives a valid command from an upstream SEB. For example, SEB 210B in FIG. 3A will send a valid signal to SEB 210N (i.e. the last SEB in column 301) to invert the data line at port 349A (FIG. 3A).

The DC bias received from port 349 may also be used to power switches 346, 354 and other bypass circuitry. The isolated power supply 356 may be used to generate power for the switches. In one aspect, galvanic isolation using isolator 328 and transistor 327 keeps the grounds between SEBs electrically separated to prevent (or reduce) noise interference to high speed data lines. Diode D5 provides reverse voltage/current protection.

An output 317 from isolated power supply 356 via diode D4 is wired or combined with an output 323 from DC power supply 360. Under normal operating conditions, when external power supply 364 is operational, the LAN bypass circuitry, described below in detail, will use the power from external power supply 364. If there is a loss of power from external power supply module 364, then output 317 from the isolated power supply 356 is used to power the bypass circuitry of SEB 210.

In one aspect, the low voltage detector 358 receives an input 333 to validate the DC bias received by port 349. The low voltage detector 358 provides an enable signal 335 to isolated power supply 356 indicating that the voltage received from a previous unit is within a valid range. This enables the isolated power supply 356 to power the LAN switches 346 and 354, when the external power becomes unavailable.

The CPU 342 controls the overall processing of the SEB by executing firmware instructions out of a memory (not shown). The watchdog 390 detects if the CPU 342 is malfunctioning at any given time. When the CPU 342 malfunctions, the watchdog 390 resets the CPU 342, which drives the GPIO (general-purpose input/output) output 382 to high. Output 382 is provided to Q2 transistor 307, which prevents the switch 354 from inadvertently inverting a data line.

In one aspect, the plurality of physical layer transceivers (PHY) devices 348 and 352 are coupled to switch 381. The switch 381 may be a Gigabit Ethernet switch. As an example, PHY devices 348/352/363 are single pair Ethernet PHYs to implement the Ethernet physical layer portion of the 100/1000BASE-T1 standard defined by the IEEE 802.3bw and IEEE 802.3 bp standard. PHY devices 348/352/363 may be the Marvell® 88Q2110/88Q2112 devices provided by the Marvell Semiconductor Corporation (without derogation of any trademark rights).

As an example, PHY devices 346/352 interface with the switch 381 via a Reduced Gigabit Media Independent Interface (RGMII) interface. RGMII is an alternative to the Gigabit Media Independent Interface (GMII) to reduce the number of pins required to connect a Gigabit Ethernet MAC to a Gigabit PHY from 24 to 12. The adaptive aspects of the present disclosure are not limited to any specific standard.

Switch 381 routes data to monitors/handsets 368 via module 360 and PHY device 363. The PHY device 363 may be 100BaseT1 device, 1000BaseT1 device or any other device type.

During normal operations, data received at port 343 is transmitted using switches 346 and 354. Switch 346 and 354 use terminals C and A for transmitting data during normal operation. A bypass function (or mode, used interchangeably) with terminals C and B are used to route data when the normal data path via terminals C and A cannot be used due to a fault/error, as described below in detail.

CPU 342 has a default, GPIO output 382 that is high and as mentioned above, which drives the transistor Q2 307 to high. When the CPU receives a command to invert the data line from C to A at switch 354, it drives a GPIO output 380 to low. Since there may be no DC bias at port 349, this drives a high signal 384 for the A/B select input at switch 354 to invert the data line from C to A, to C to B.

In one aspect, the monitoring module 344 monitors the switches 346 and 354, switch 381, PHYs 348, 352 and 363, CPU 342 commands, and various internal voltages 337. Switch 381 provides a "switch OK" signal 374 via a GPIO pin indicating that the switch 381 is operational.

Based on the monitoring, when the monitoring module 344 detects an internal fault/error, it initializes a bypass mode via signal 376 that is sent to switch 346. A "bypass on" signal 319 is also sent to switch 354. The bypass at switch 354 is enabled or disabled via signal 313 that is based on signal 319. A bypass status signal 378 is also provided to CPU 342. CPU 342 verifies the content of boot up EEPROM 350 and monitors proper operating conditions of switch 381, if these are not correct then CPU 342 send a control signal 392 to monitor 344 to set switches 346 and 354 in a bypass mode.

When the bypass mode is enabled, switch 354 is disabled and data from switch 346 is sent directly to port 349 via output transformer 362 using paths 371/372 without any interference/signal degradation from switch 354. This reduces signal loss, and because the circuit is connected in parallel, the data signal only has to travel through one internal switch.

If the CPU 342 is mal functioning, the watchdog timer 390 resets the CPU 342 and a "high" signal 382 is generated. This prevents the CPU 342 to inadvertently invert the data line from C to B, even when the SEB is the last SEB.

It is noteworthy that the switching function and CPU functions are independent i.e. even when CPU 342 fails, the data paths can operate using terminals C to A of switches 346 and 354, respectively.

In one aspect, as described above, when there is an internal fault at SEB 210, then the bypass function/mode is activated using signal 319. Switch 354 is disabled, while connection between terminals C and B is established to route data from port 343 to port 349 via paths 371/372.

In another aspect, there may be an "external fault" e.g. the CPU 342 is not able to receive any data from port 343, FDB 208, or ADB 206. This could be due to a broken cable, a bad transformer or any other defect. To handle the external fault, CPU 342 first deactivates the upstream port, e.g. 343, and signal 382 is generated to invert the data paths through switches 346 and 354 to receive data from a downstream port using the inverted cable 340.

In yet another aspect, if there is a fault such that FDB cannot receive data, then the CPU 342 inverts switch 354 to receive data from another FDB using a loopback port and an inverting cable, as described below.

In another aspect, when there is an internal fault involving an FDB component, then monitor 344 activates the bypass mode to send data via a loopback port also described below.

Figure 4I:
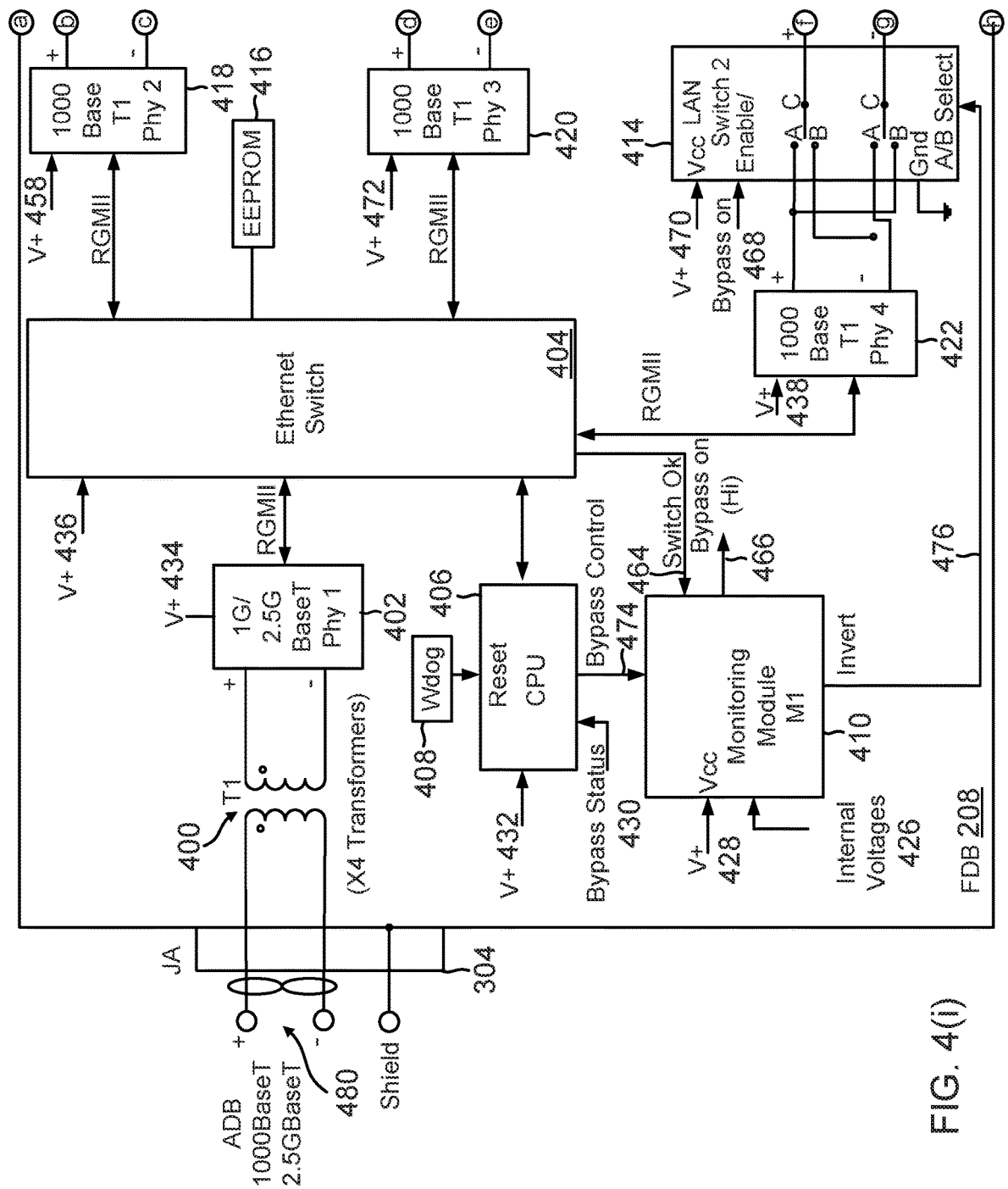
FIG. 4 (shown in FIG. 4(i)-(ii)) shows a schematic of a floor disconnect box (FDB) used in a content distribution system, according to one aspect of the present disclosure.
Figure 4:
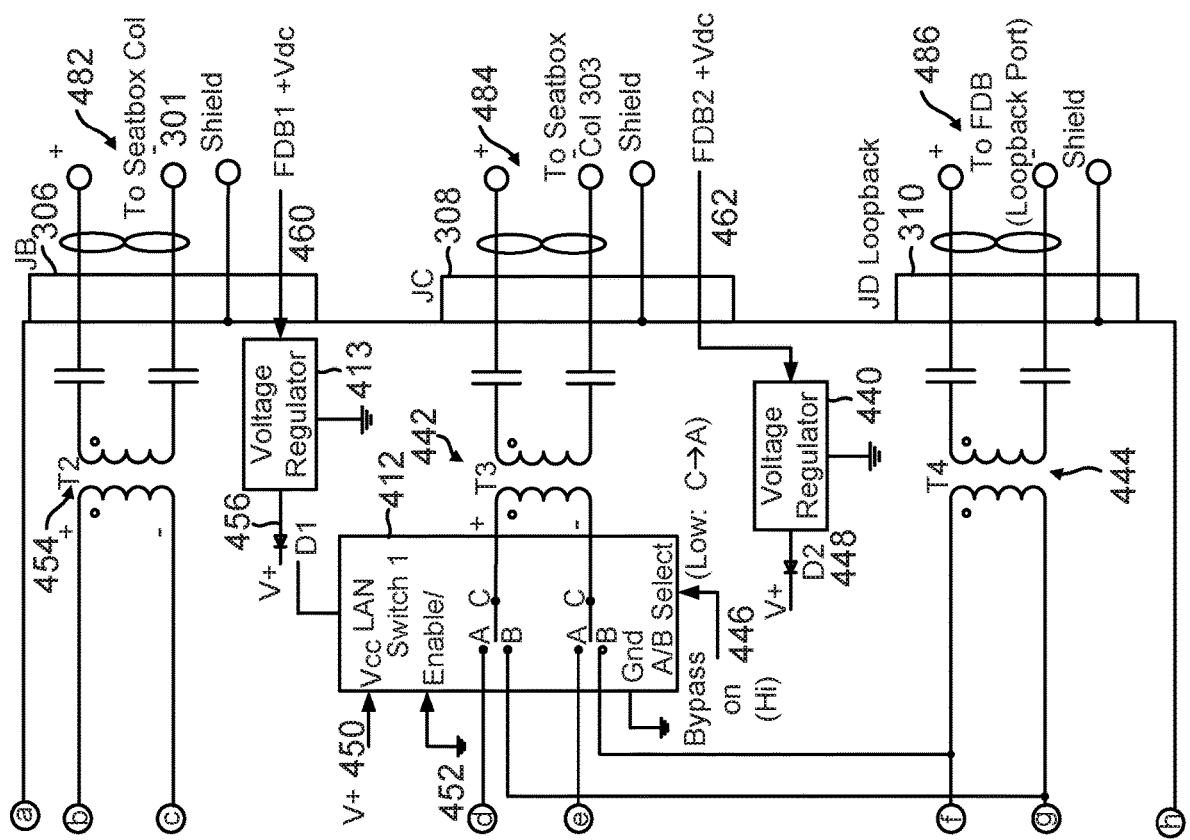

FDB 208:

FIG. 4 shows a detailed schematic for FDB 208 that supports a bypass function for internal and external failures, according to one aspect of the present disclosure. FDB 208 includes interface 304 with port 480 (similar to 351 of FIG. 3A), interface 306 with port 482 (similar to 353), interface 308 with port 484 (similar to 355), and interface 310 with loopback port 486 (similar to 357). Port 480 is coupled to an ADB, while ports 482/484 are coupled to a SEB of columns 301 and 303, as shown in FIG. 3A. Loopback port 486 is coupled to a loopback port of another FDB (not shown) such that traffic can be diverted to and/or from the other FDB, in case of a failure using an inverted cable.

FDB 208 includes various components that are functionally similar to the components of SEB 210, described above with respect to FIG. 3B. For example, FDB 208 includes a CPU 406 (similar to CPU 342 of FIG. 3B), a watchdog 408 (similar to watchdog 390), PHYs 402, 418, 420, and 422 (similar to PHYs 348, 352 etc.), switch 404 (similar to switch 340), EEPROM 416 (similar to EEPROM 350), switch 412 (similar to switch 346), switch 414 (similar to switch 354), input transformer 400 (similar to input transformer 360), output transformers 442 and 454 (similar to output transformer 362), output transformer 444 that is used for traffic received at port 486 from a loopback port of another FDB, and a monitoring module 410 (similar to monitoring module 344). For brevity sake, these components are not being described again.

Voltage regulators 413 and 440 receive voltage 460 and 462, from SEBs connected to ports 482 and 484, respectively. Two separate voltage regulators are used to provide redundancy and avoid a single point of failure. Outputs 456 and 448 from voltage regulators 413 and 440 are summed via diodes D1 and D2, respectively, for providing a common voltage "V+" for various FDB components. All internal voltages 426 are derived from the sum of outputs 456 and 448. For example, V+ 432 powers CPU 406, V+ 428 powers monitor 410, V+ 434 powers PHY 402, V+ 436 powers switch 404, V+ 458 powers PHY 418, V+ 450 powers switch 412, V+ 470 powers switch 414, V+ 438 powers PHY 422, and V+ 472 powers PHY 420.

"Bypass on" signal 466 is similar to signal 319 (FIG. 3B), internal voltages 426 are similar to internal voltages 337, "switch ok" signal 464 is similar to signal 374, "bypass status" signal 430 is similar to signal 378, and "bypass control" signal 474 is similar to signal 392. The bypass on signal 446 to switch 412 is similar to the bypass on signal 376. The bypass on signal 468 to switch 414 is similar to signal 313. For brevity sake, these signals are not described again.

During normal operation data flows from port 480 to port 482, 484, and 486 via switches 412 and 414 using terminals A to C. If there is an error at an ADB or if a cable connecting port 480 to an ADB is faulty, then the CPU 406 detects the external fault because of no communication to upstream ADB. The CPU 406 first disables port 480 and then switch 414 is instructed by signal 476 to invert data flow. This will enable data to flow from another FDB via loopback port 486 and flow through switch 414 using terminals C and B, instead of terminals A and C. The data from the other FDB port is then sent out via ports 482 and 484 to SEBs in columns 301 and 303.

If there is an internal fault detected by the monitoring module 410, then the bypass mode for switch 412 is enabled by signals 466/452. This enables data flow from port 484 to loopback port 486 using terminals C and B. When the bypass mode is enabled and operational, signal 468 is used to disable the switch 414 to avoid any noise and interference to data flow from port 484 to port 486 via switch 412. It is noteworthy that the switch 412 inverts the data line using terminals C and B, and an inverting cable (similar to 340, FIG. 3B) that connects the loopback port 486 to another loopback port (not shown) to enable data to flow to SEBs in column 303.

While the bypass mode is enabled, SEBs coupled to port 482 in column 301 do not receive data. To restore data flow to column 301, the first port 343 at the closest SEB is closed and the last SEB activates inversion at the appropriate LAN switch (e.g. 354, FIG. 3B) described above in detail.

It is noteworthy that certain aircraft do not use a FDB and in that case, the inversion/bypass mode operates with respect to an ADB.

Figure 5A:
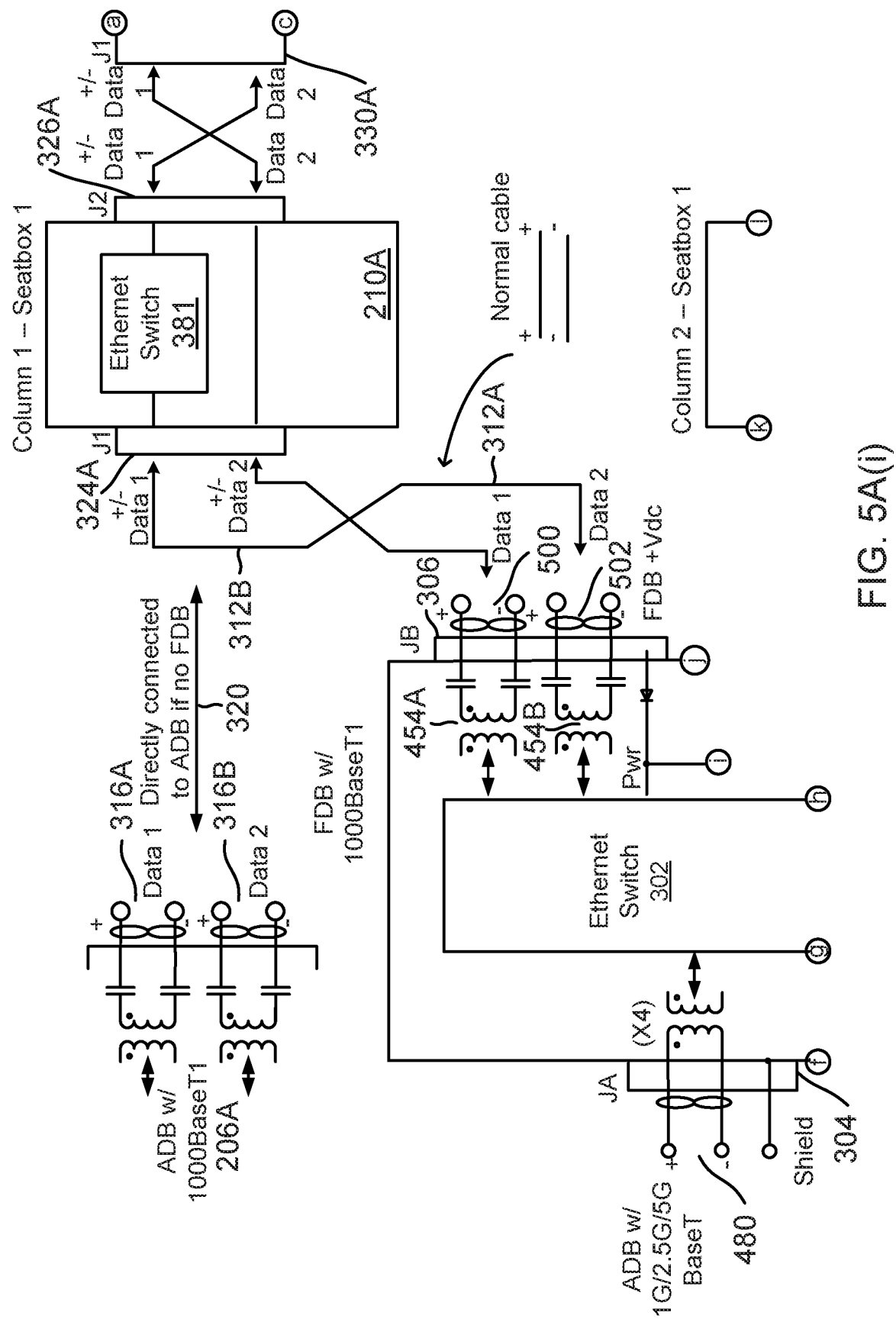
FIG. 5A (shown in FIG. 5A(i)-(iv)) shows yet another example of a content distribution system, according to one aspect of the present disclosure.

Configuration 501:

FIG. 5A shows an example of a configuration 501 that doubles the data throughput of configuration 300 (FIG. 3A) with dual recovery paths, according to one aspect of the present disclosure. In configuration 501, ADBs 206A/206B both provide dual data paths using ports 316A/316B and 318A/318B, where the ADBs are directly connected to the SEBs in columns 301 and 303. FDB 208A (similar to FDB but with additional components) also includes extra set of output transformers, for example, 454A/454B, 442A/442B and 444A/444B for supporting two data paths (shown as "Data 1" and "Data 2") from each port. Interface 306 includes ports 500 and 502 each coupled to interface 324A via standard cable 312A and 312B to support data paths Data 1 and Data 2. Interface 308 includes ports 504 and 506 coupled to interface 324B using cables 314A and 314B for supporting Data 1 and Data 2 paths. The loopback interface 310 also includes ports 510 and 512 for supporting two data paths. Interface 326A and 330A, and interface 326B and 330B also communicate using two separate cables for Data 1 and Data 2 paths. Interface 336A and 336B of the last SEBs 210N and 211N are connected via inverted cables 340A and 340B. The bypass function in configuration 501 is similar to the bypass functions discussed above with respect to FIGS. 3A/3B and 4. For brevity sake, the bypass functions are not being described again.

Figure 5B:
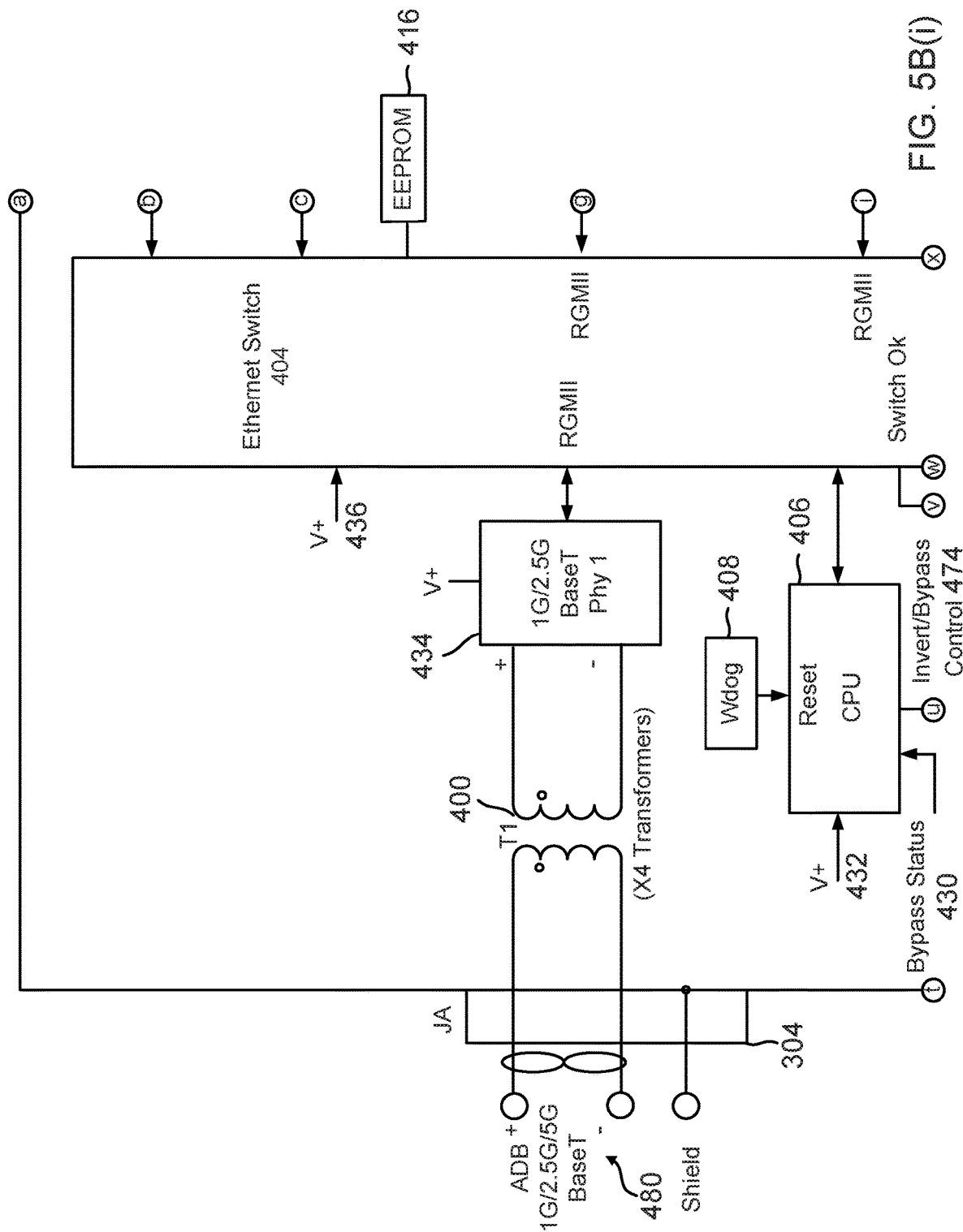
FIG. 5B (shown in FIG. 5B(i)-(iv)) shows an example of a FDB for use in the system of FIG. 5A, according to one aspect of the present disclosure.

FDB 208A:

FIG. 5B show an example of FDB 208A to support higher throughput of configuration 501, according to one aspect of the present disclosure. Various components of FDB 208A are similar to FDB 208 described above with respect to FIG. 4, and for brevity sake, the common components are not being described in detail.

To support the extra data line, FDB 208A includes an extra internal switches shown as 412A/412B, 414A and 414B, respectively. FDB 208A also includes extra PHYs shown as 418A/418B, 420A/420B, and 422A/422B. The various bypass signals and functions of FIG. 5B are similar to the bypass signals and functions described above with respect to FIGS. 3B and 4, except the bypass functions are used for two data paths.

Figure 6A:
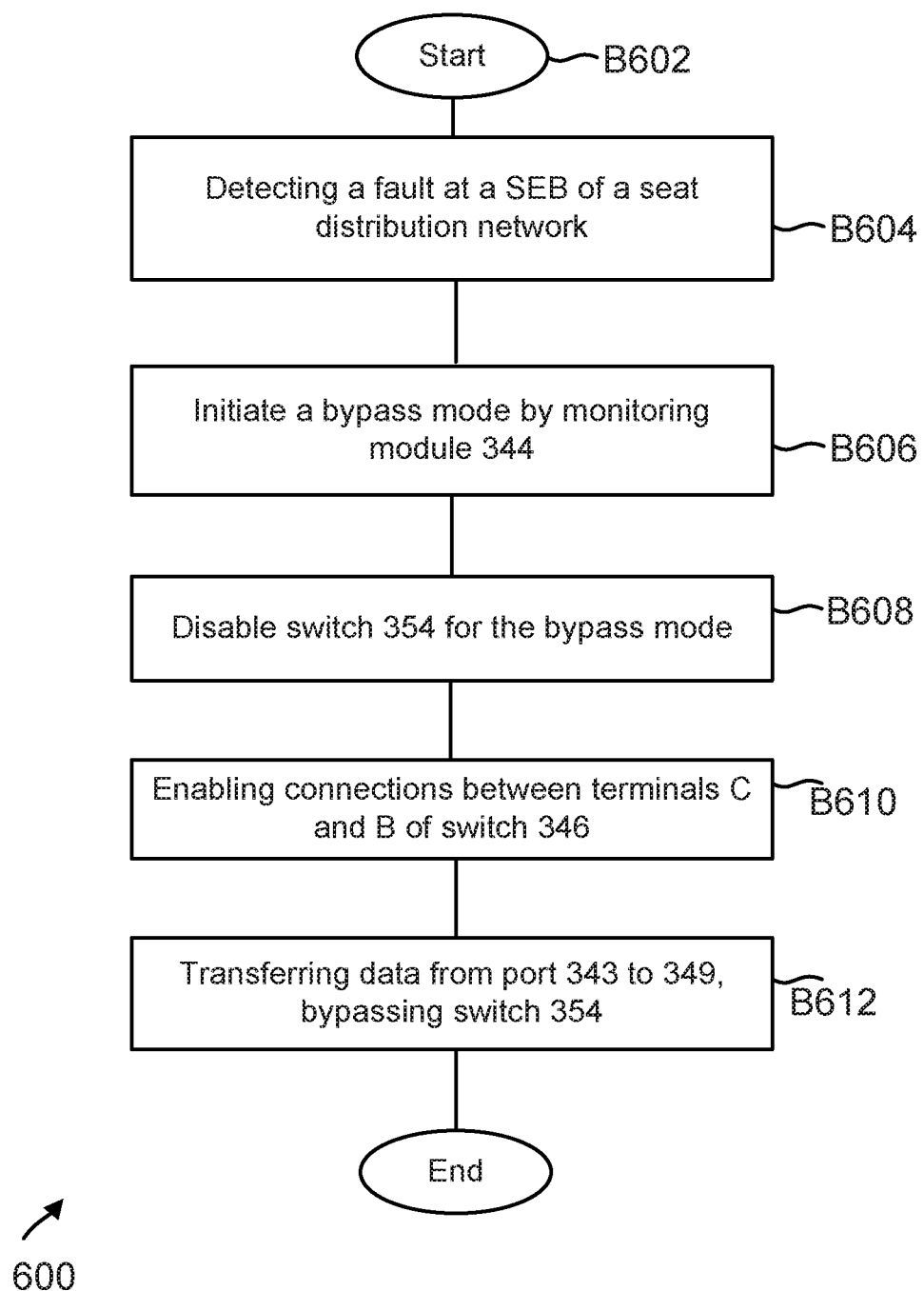
FIG. 6A shows a process for handling internal faults at a SEB, according to one aspect of the present disclosure.

Process Flows:

FIG. 6A shows a process flow 600 according to one aspect of the present disclosure. The process begins in block B602 when a seat distribution network (e.g. 300, FIG. 3A) has been initialized and is operational.

In block B604, a SEB (e.g. 210, FIG. 3B) of the distribution network detects a fault. As an example, the fault may be detected by the monitoring module 344. The fault may be internal due to failure of any component of SEB 210. In block B606, a bypass mode is initiated. In one aspect, the bypass mode is initiated by the monitoring module 344 via a signal, e.g. 319, described above.

In block B608, an internal switch (e.g. 354) of SEB 210 is disabled. In block B610, the connection between terminals C and B of switch 346 are enabled, based on signal 376. Thereafter, data received at port 343 is transferred to port 349 via bypass paths 371/372 from switch 346. Since switch 354 is disabled, it reduces any noise or interference to the data transfer via paths 371/372 between switch 346 and port 326.

Figure 6B:
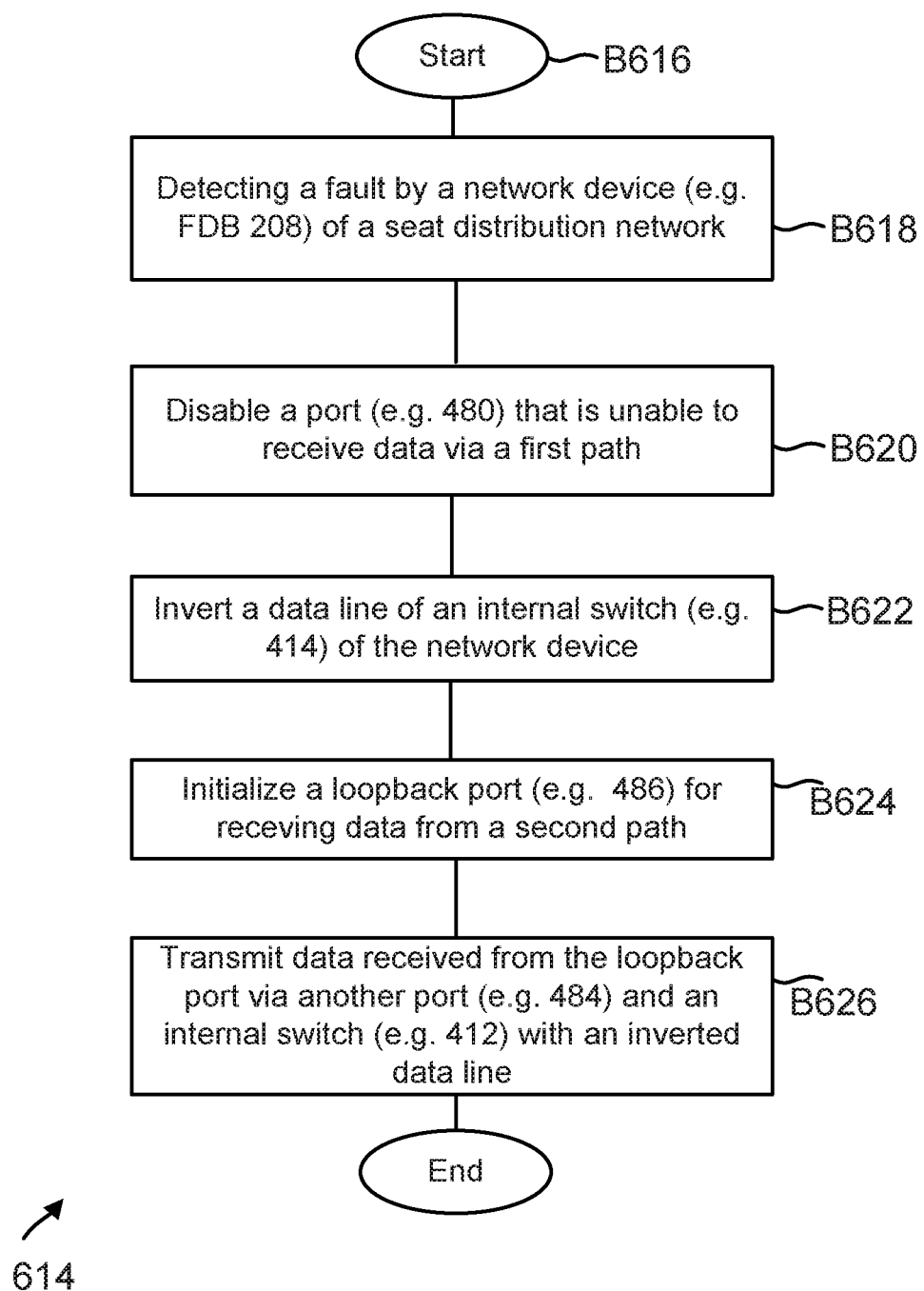
FIG. 6B shows a process for handling external faults by a network device of a content distribution system, according to one aspect of the present disclosure.

FIG. 6B shows a process 614 for handling faults in a seat distribution network, according to one aspect of the present disclosure. Process 614 begins in block B616, when the seat distribution network of an aircraft (or any other transportation vehicle) has been initialized and operational. In block B618, a network device of the network detects a fault. In one aspect, the fault may be detected by a FDB (e.g. 208, FIG. 4) (or an ADB, when a FDB is not used on the aircraft). The fault may be detected by CPU 406 that does not receive data expected at a port (e.g. 304) via a first path. In block B620, the CPU 406 disables the port 480.

In block B622, the data line of switch 414 is inverted and the loopback port 486 is initialized such that data can be received from another column using a second path i.e. via port 486 and an inverted cable. In block B626, the data received at port 486 is transferred to SEBs via port 484 and switch 412, using the inverted data line of switch 412. This enables data to flow from another ADB using port 486 and an inverted cable.

Figure 6C:
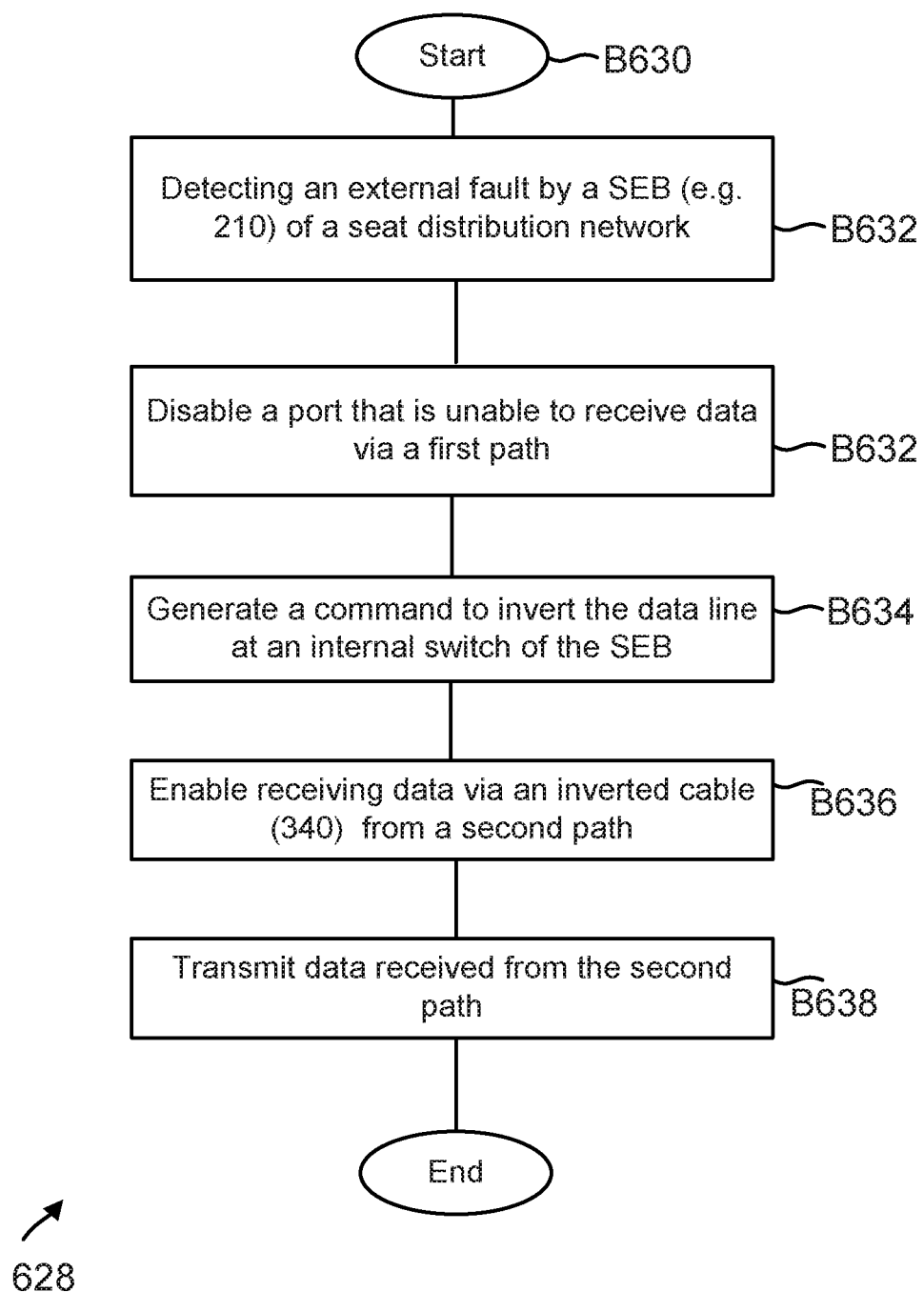
FIG. 6C shows a process for handling external faults at a SEB, according to one aspect of the present disclosure.

FIG. 6C shows a process 628 for processing external faults detected by a SEB, according to one aspect of the present disclosure. The process begins in block B630, when the SEBs of columns 301 and 303 (FIG. 3A) have been initialized to receive data. In block B632, CPU 342 detects that it has not received data from port 343. In block B632, CPU 342 executing firmware instructions, disables port 343 from which the SEB has not received the expected data. A command 380 is generated in block B634 to invert the data lines at switches 354 and 346. In block B636, when the SEB is the last SEB (e.g. 210N), then the inverted cable 340 is used to receive data from the last SEB of column 303. In block B638, the SEB transmits the data received from the second path to monitors/handsets.

In one aspect, the systems and methods disclosed herein are able to provide redundancy and use the light weight (i.e. two wires) 1000BaseT1 technology. It is noteworthy that the systems and processes described above have been described for an aircraft, however, the adaptive aspects may be used in any transportation vehicle using content distribution networks.

Figure 7:
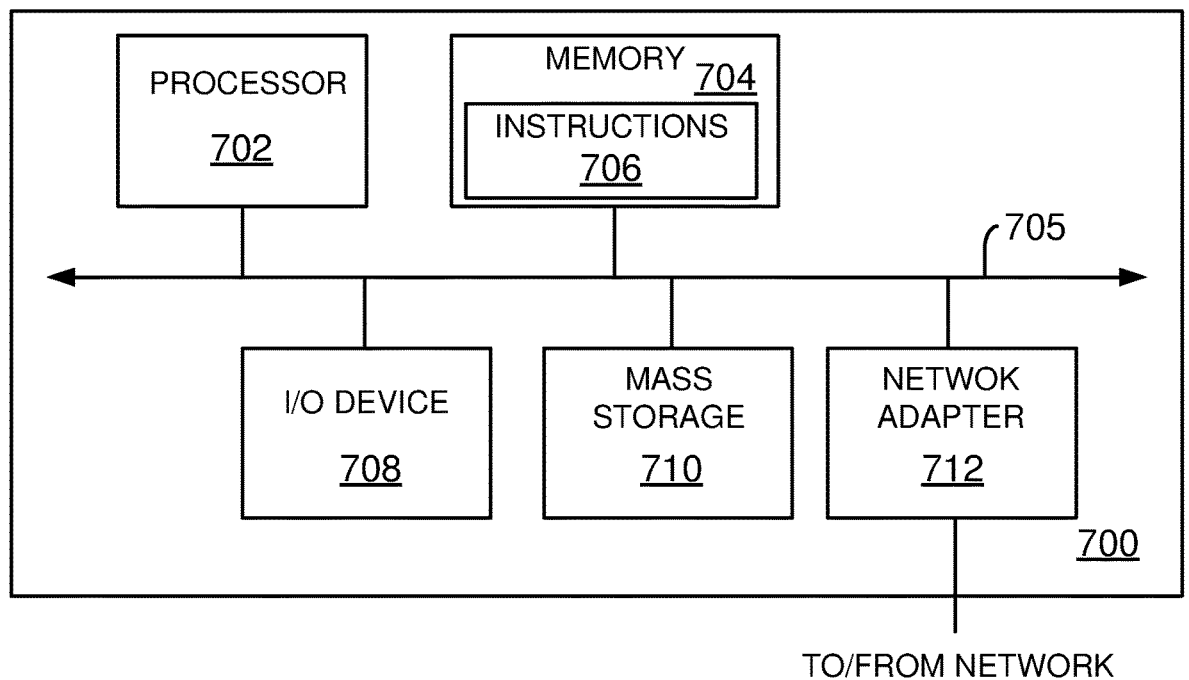
FIG. 7 shows a block diagram of a computing system, used according to one aspect of the present disclosure.

Processing System:

FIG. 7 is a high-level block diagram showing an example of the architecture of a processing system 700 that may be used according to one aspect. The processing system 700 can represent media server 112, computing system 106, WAP 130, or any other device that attempts to interface with a vehicle computing device. Note that certain standard and well-known components which are not germane to the present aspects are not shown in FIG. 7.

The processing system 700 includes one or more processor(s) 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 702 are the central processing units (CPUs) of the processing system 700 and, thus, control its overall operation. In certain aspects, the processors 702 accomplish this by executing software stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 may be used to implement the process steps of FIGS. 6A-6C described above.

Also connected to the processors 702 through the bus system 705 are one or more internal mass storage devices 710, and a network adapter 712. Internal mass storage devices 710 may be, or may include any conventional medium for storing large volumes of data in a non-volatile manner, such as one or more magnetic or optical based disks, flash memory, or solid-state drive.

The network adapter 712 provides the processing system 700 with the ability to communicate with remote devices (e.g., over a network and may be, for example, an Ethernet adapter or the like.

The processing system 700 also includes one or more input/output (I/O) devices 708 coupled to the bus system 705. The I/O devices 708 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for network communication on a transportation vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    detecting an internal fault at a seat electronic box (SEB) of a distribution network of an aircraft, the distribution network used for distributing data to a plurality of seat devices;
    wherein the SEB includes a first switch that receives data from a first port, and a second switch connected to a second port that transmits data to a next SEB, when the SEB is not a last SEB of a first column having a plurality of SEBs;
    initiating a bypass mode at the SEB, in response to detecting the internal fault;
    disabling the second switch in response to initiating the bypass mode;
    enabling connection between a first terminal and a second terminal of the first switch for the bypass mode; wherein during standard operation of the SEB, without the internal fault, the first switch uses the first terminal and a third terminal for transmitting data to the second switch; and
    transferring data from the first port to the second port via the first switch using the first terminal and the second terminal via a bypass path directly connecting the first port and the second port, bypassing the second switch disabled for the bypass mode.

2. The method of claim 1, wherein the SEB is a last SEB of the first column, and is coupled to a last SEB of a second column using an inverted cable that is not used for network communication during standard operation.

3. A method, comprising:
    detecting an internal fault at a seat electronic box (SEB) of a distribution network of an aircraft, the distribution network used for distributing data to a plurality of seat devices;
    wherein the SEB includes a first switch that receives data from a first port, and a second switch connected to a second port that transmits data to a next SEB, when the SEB is not a last SEB of a first column having a plurality of SEBs;
    initiating a bypass mode at the SEB, in response to detecting the internal fault;
    disabling the second switch in response to initiating the bypass mode;
    enabling connection between a first terminal and a second terminal of the first switch for the bypass mode; wherein during standard operation of the SEB, without the internal fault, the first switch uses the first terminal and a third terminal for transmitting data to the second switch; and transferring data from the first port to the second port via the first switch using the first terminal and the second terminal, bypassing the second switch disabled for the bypass mode; wherein the SEB is a last SEB of the first column, and is coupled to a last SEB of a second column using an inverted cable.

4. The method of claim 3, wherein the inverted cable is not used for network communication during standard operation.

5. The method of claim 3, wherein a central processing unit (CPU) of the SEB generates a signal for inverting a data line for using the inverted cable to send and receive data to and from the last SEB of the second column.

6. The method of claim 5, wherein the SEB is able to receive and transmit data using the first switch, the second switch and an Ethernet switch, upon malfunctioning of the CPU.

7. A method, comprising:
    detecting an internal fault at a seat electronic box (SEB) of a distribution network of an aircraft, the distribution network used for distributing data to a plurality of seat devices;
    wherein the SEB includes a first switch that receives data from a first port, and a second switch connected to a second port that transmits data to a next SEB, when the SEB is not a last SEB of a first column having a plurality of SEBs;
    initiating a bypass mode at the SEB, in response to detecting the internal fault;
    disabling the second switch in response to initiating the bypass mode; and
    enabling connection between a first terminal and a second terminal of the first switch for the bypass mode; wherein during standard operation of the SEB, without the internal fault, the first switch uses the first terminal and a third terminal for transmitting data to the second switch; and transferring data from the first port to the second port via the first switch using the first terminal and the second terminal, bypassing the second switch disabled for the bypass mode;
    wherein a bias voltage at the second port from another SEB indicates to the SEB that it is not a last SEB in the first column.

8. A method, the method comprising:
    detecting a fault by a network device of a distribution network of an aircraft, the distribution network used for distributing data to a plurality of seat devices of the aircraft;
    wherein the network device detects the fault when it is unable to receive data at a first port via a first path of a network connection;

disabling the first port by the network device;
inverting a data line of a first switch of the network device;
initializing a second port of the network device for receiving data from a second path using the inverted data line of the first switch, the second port used as a loopback port; and
transmitting the received data to the plurality of seat devices via a third port using an inverted data line of a second switch of the network device.

9. The method of claim 8, wherein the network device is a floor disconnect box (FDB) connected to a plurality of seat electronic boxes (SEBs) that provide content to the plurality of seat devices.

10. The method of claim 9, wherein the FDB is coupled to another FDB via an inverted cable at the second port.

11. The method of claim 9, wherein the FDB is coupled to a first area distribution box (ADB) via the first path.

12. The method of claim 11, wherein the FDB receives data from a second ADB at the second port via the second path, when data is not received from the first ADB.

13. The method of claim 9, wherein upon detection of an internal fault at the FDB, the first switch is disabled and data received from the second port is transmitted in a bypass mode by the third port using the second switch.

14. The method of claim 8, wherein an inverted cable is coupled to the second port and the inverted cable is used to receive data at the second port.

15. A network for an aircraft, the network comprising:
a plurality of seat electronic boxes (SEBs) coupled to a plurality of seat devices, the SEBs used for distributing content to the plurality of seat devices for an in-flight entertainment system;
wherein a SEB includes a first switch that receives data from a first port and a second switch connected to a second port to transmit data to a next SEB, when the SEB is not a last SEB of a first column of SEBs;
wherein a bias voltage at the second port from another SEB indicates to the SEB that it is not a last SEB in the first column;
wherein when the SEB detects an internal fault and initiates a bypass mode, the second switch is disabled, enabling connection between a first terminal and a second terminal of the first switch;
wherein during the bypass mode, data from the first port is transferred to the second port via the first switch using the first terminal and the second terminal, bypassing the disabled second switch.

16. The network of claim 15, wherein when the SEB is a last SEB of the first column, the SEB is coupled to a last SEB of a second column using an inverted cable.

17. The network of claim 16, wherein the inverted cable is used to receive data by the last SEB of the first column, when the last SEB of the first column detects an external fault.

18. The network of claim 16, wherein a central processing unit (CPU) of the SEB generates a signal for inverting a data line for using the inverted cable to send and receive data to and from the last SEB of the second column.

19. The network of claim 15, wherein the SEB is coupled to a floor disconnect box (FDB) that receives data from an area distribution box (ADB).

20. The network of claim 15, wherein the SEB receives data from an area distribution box (ADB).

* * * * *